(12) United States Patent
Fang et al.

(10) Patent No.: US 10,164,249 B2
(45) Date of Patent: Dec. 25, 2018

(54) POSITIVE ACTIVE MATERIAL FOR SECONDARY LITHIUM BATTERY, METHOD FOR PREPARING THE SAME AND SECONDARY LITHIUM BATTERY CONTAINING THE POSITIVE ACTIVE MATERIAL

(71) Applicant: Contemporary Amperex Technology Co., Limited, Ningde, Fujian (CN)

(72) Inventors: Xiangpeng Fang, Fujian (CN); Chengren Wu, Fujian (CN); Na Liu, Fujian (CN); Xuguang Gao, Fujian (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 477 days.

(21) Appl. No.: 14/831,871

(22) Filed: Aug. 20, 2015

(65) Prior Publication Data
US 2016/0240842 A1 Aug. 18, 2016

(30) Foreign Application Priority Data
Feb. 12, 2015 (CN) .......................... 2015 1 0074642

(51) Int. Cl.
| | | |
|---|---|---|
| H01M 4/36 | (2006.01) | |
| H01M 4/505 | (2010.01) | |
| H01M 4/131 | (2010.01) | |
| H01M 4/525 | (2010.01) | |
| C01G 51/00 | (2006.01) | |
| C01G 53/00 | (2006.01) | |

(52) U.S. Cl.
CPC ............ *H01M 4/366* (2013.01); *C01G 51/42* (2013.01); *C01G 51/66* (2013.01); *C01G 53/42* (2013.01); *C01G 53/50* (2013.01); *C01G 53/66* (2013.01); *H01M 4/131* (2013.01); *H01M 4/505* (2013.01); *H01M 4/525* (2013.01); *C01P 2004/84* (2013.01); *C01P 2006/40* (2013.01)

(58) Field of Classification Search
None
See application file for complete search history.

(56) References Cited

U.S. PATENT DOCUMENTS

| | | | | |
|---|---|---|---|---|
| 9,812,702 | B2 * | 11/2017 | Ikeuchi | ................. H01M 4/62 |
| 2005/0019659 | A1 * | 1/2005 | Shiozaki | ............... H01M 4/505 |
| | | | | 429/231.3 |
| 2006/0166098 | A1 * | 7/2006 | Tabuchi | ................ H01M 4/134 |
| | | | | 429/232 |
| 2009/0087660 | A1 * | 4/2009 | Suzuki | .................... C01B 25/45 |
| | | | | 428/403 |
| 2012/0264018 | A1 * | 10/2012 | Kong | ................. C01G 45/1242 |
| | | | | 429/220 |
| 2014/0038043 | A1 * | 2/2014 | Hirayama | ............... C01B 33/32 |
| | | | | 429/211 |
| 2014/0332718 | A1 * | 11/2014 | Kojinna | .................. C01B 33/32 |
| | | | | 252/182.1 |
| 2015/0056500 | A1 * | 2/2015 | Huang | ............. H01M 10/0567 |
| | | | | 429/200 |
| 2018/0083285 | A1 * | 3/2018 | Yamashita | ............ H01M 4/628 |

* cited by examiner

*Primary Examiner* — Rena Dye Cronin

(57) ABSTRACT

The present invention provides a positive active material for use in a secondary lithium battery, a method for preparing the positive active material and a secondary lithium battery containing the positive active material. The positive active material includes a core of lithium transition metal oxide represented by Formula $Li_xM_yN_{1-y}O_{2-\alpha}A_\beta$ and a coating layer of lithium transition metal silicate represented by Formula $x'Li_2O \cdot y'N'O_a \cdot SiO_{2-\lambda}B_\zeta$ which in-situ formed on the core, wherein $0.8 \leq x \leq 1.3$, $0.6 \leq y \leq 1.0$, $0.01 \leq x' \leq 2.1$, $0.2 \leq y' \leq 1.5$, $0.1 \leq a \leq 3.0$, $0 \leq \alpha \leq 0.2$, $0 \leq \beta \leq 0.4$, $0 \leq \lambda \leq 0.5$, $0 \leq \zeta \leq 0.5$. The positive active material according to the present invention has high capacity, desirable cycling performance and safety performance, as well as desirable thermal stability.

13 Claims, No Drawings

POSITIVE ACTIVE MATERIAL FOR SECONDARY LITHIUM BATTERY, METHOD FOR PREPARING THE SAME AND SECONDARY LITHIUM BATTERY CONTAINING THE POSITIVE ACTIVE MATERIAL

CROSS-REFERENCE TO RELATED APPLICATION

The present patent application claims the benefit of Chinese patent application number CN 201510074642.0 filed on Feb. 12, 2015, the contents of which are hereby incorporated by reference.

BACKGROUND

The present invention generally relates to secondary lithium batteries and, more particularly, to a positive active material having desirable performances for secondary lithium battery and a method for preparing the same.

DESCRIPTION OF RELATED ART

At present, positive active materials used in lithium ion batteries generally include spinel structure $LiM_2O_4$ (M is Co, Ni, Mn et al.), layered lithium transition metal oxides $LiMO_2$ (M is Mn, Co, Ni et al) and olivine structure lithium phosphate salt $LiMPO_4$ (M is Fe, Mn, Co, Ni et al). Layered lithium transition metal oxide $LiCoO_2$ is one of the most popular positive active materials in commercial applications due to simple synthesis process and mature application technology. However, due to high price of cobalt, toxicity of cobalt and poor safety performance, $LiCoO_2$ can hardly meet the actual requirements of large secondary lithium battery, especially cannot meet the requirements of power batteries which have high safety performances and a long cycle life. To improve the electrochemical performances of $LiCoO_2$, such as safety performance and cycling performance, it is proposed that coating treatment is applied to $LiCoO_2$. However, $LiCoO_2$ with coating treatment still cannot meet the requirements of actual use.

Layered lithium transition metal oxides represented by Formula $LiNi_xCo_yM_{1-x-y}O_2$ is one of the latest positive active materials which have been widely used in lithium ion batteries due to low price, simple synthesis process, high energy density and desirable safety performance $LiNi_xCo_yM_{1-x-y}O_2$ is considered as one of the latest positive active materials which may substitute $LiCoO_2$, and may be widely used as positive active materials in hybrid vehicle batteries. However, some problems still exist for $LiNi_xCo_yM_{1-x-y}O_2$ as cathode material for secondary lithium battery, such as cell swelling at high cut-off voltage, particle pulverizing cycled hundred or thousand times, which may lead to safety accidents of secondary lithium battery due to overcharge or thermal runaway.

In order to improve the performances of $LiNi_xCo_yM_{1-x-y}O_2$, it is proposed that composite including lithium metal phosphate ($LiMPO_4$) and metal phosphate ($M_3(PO4)_2$) can be coated on the surface of nickel-based oxide positive active material, so as to improve the safety performance of the secondary lithium battery via improving the thermal stability of the positive active material. However, the proposal mentioned above still has the following disadvantages. Firstly, $M_3(PO_4)_2$ can hardly transmit into $LiMPO_4$; Secondly, it is difficult to control the ratio of $M_3(PO_4)_2$ to $LiMPO_4$; Thirdly, the content of lithium on the surface of nickel-based oxide positive active material has to be higher than that in the core, which will limit the application of the positive active material; Fourthly, the coating layer is formed via sintering the composite deposited on the surface of the core. It is difficult to form complete and compact coating layer. Electrolyte and HF in the electrolyte may contact the core that fails to be coated by the coating layer and react with the core. In addition, the coating layer is physically bonded to the core. Therefore, after long time cycles, the coating layer may peel off from the core and cannot protect the core anymore.

In addition, it has been reported that oxides, such as $Al_2O_3$, $AlPO_4$, $ZrO_2$, $TiO_2$ and $B_2O_3$, can be used to coat the positive active materials, so as to improve the surface structural stability of the positive active materials and improve the cycling performance of the lithium ion batteries at high voltage. However, the metal oxides mentioned above for coating the core are all non-electrochemically active materials having poor lithium ion conductivity. Therefore, the coating layer of metal oxides can hardly improve the performances of the positive active materials. Some even may adversely affect the performances of the positive active materials.

What is needed, therefore, is to provide a positive active material having desirable performances for use in secondary lithium batteries and method for preparing the same.

BRIEF SUMMARY

One object of the present invention is to provide a positive active material having high capacity and stability as well as desirable safety performance and cycling performance for use in a secondary lithium battery and method for preparing the same. The other object of the present invention is to provide a secondary lithium battery which has high capacity and stability as well as desirable safety performance and cycling performance.

According to one embodiment of the present invention, a positive active material for use in a secondary lithium battery includes a core of lithium transition metal oxide represented by Formula $Li_xM_yN_{1-y}O_{2-\alpha}A_\beta$ and a coating layer of lithium transition metal silicate represented by Formula $x'Li_2O \cdot y'N'O_a \cdot SiO_{2-\lambda}B_\zeta$ in-situ formed on the core, wherein the element represented by M is at least one of Ni, Co and Mn; the element represented by N and N' each is at least one of Na, K, Rb, Cs, Be, Mg, Ca, Sr, Ba, Ra, Al, Ga, In, Ge, Sn, Sc, Ti, V, Cr, Mn, Fe, Co, Ni, Cu, Zn, Y, Zr, Nb, Mo, Ru, Rh, Pd, Ag, Cd, La, Ce, Pr, Nd, Sm, Eu, Gd, Tb, Dy, Ho, Er, Tm, Yb, Lu; the element represented by A and B each is at least one of N, F, P, S, Cl, Se; and $0.8 \leq x \leq 1.3$, $0.6 \leq y \leq 1.0$, $0.01 \leq x' \leq 2.1$, $0.2 \leq y' \leq 1.5$, $0.1 \leq a \leq 3.0$, $0 \leq \alpha \leq 0.2$, $0 \leq \beta \leq 0.4$, $0 \leq \lambda < 0.5$, $0 \leq \zeta \leq 0.5$.

The coating layer of lithium transition metal silicate represented by Formula $x'Li_2O \cdot y'N'O_a \cdot SiO_{2-\lambda}B_\zeta$ has desirable lithium ion conductivity and structural stability. The coating layer of lithium transition metal silicate represented by Formula $x'Li_2O \cdot y'N'O_a \cdot SiO_{2-\lambda}B_\zeta$ at least has the following functions.

1) inhibiting oxygen evolution and structure change of the core represented by Formula $Li_xM_yN_{1-y}O_{2-\alpha}A_\beta$ at high voltage: for the core without coating layer formed thereon, when the secondary lithium battery is charged to over 4.30 V, after deintercalation of lithium ions, the element represented by M mainly exists in +4. $M^{4+}$ on the surface of the core will change to $M^{3+}$ or $M^{2+}$, which will lead to structure change of the core and oxygen evolution. Because the coating layer is in situ formed on the surface of the core via chemical reaction, the coating layer can be bonded to the surface of the core via stable chemical bonding. Due to the protection of the coating layer, at high voltage, oxygen evolution and change of $M^{4+}$ into $M^{3+}$ or $M^{2+}$ is inhibited. Therefore, structural stability and cycling performance of the positive active material is remarkably improved.

2) preventing the secondary lithium battery from swelling via inhibiting the core of lithium transition metal oxide from catalyzing and oxidizing the electrolyte: the transition metal M in the core without lithium insertion mainly exist in +4 has strong catalyzing and oxidizing ability, which may lead to decomposition of the electrolyte and generation of gas and further lead to swelling of the secondary lithium battery. After coating of the coating layer, polyanionic compound of silicate on the surface of the core will reduce the catalyzing and oxidizing ability of the core, and reduce the decomposition of the electrolyte.

3) preventing HF in the electrolyte from corroding the core of lithium transition metal oxide: lithium transition metal oxide can be readily corroded by HF in the electrolyte, while silicate can absorb F ion. The coating layer can prevent HF from directly contacting the core, which will reduce dissolution of transition metals from the core and improve the stability of the positive active material.

Compared with the prior art, the coating layer of the positive active material for use in a secondary lithium battery according to the present invention can be stably bonded to the core and the coating layer has desirable lithium ion conductivity and structural stability. The positive active material according to the present invention has high capacity, desirable cycling performance, desirable safety performance, and high thermal stability. The positive active material according to the present invention also has a wider operating voltage range (having a voltage upper limit of 4.1 V-4.7 V) and stable thermal stability. The secondary lithium battery containing the positive active material according to the present invention has high volumetric energy density and desirable cycling performance According to one aspect of the present invention, the element represented by N' and the element represented by N are same or different, and the element represented by B and the element represented by A are same or different.

According to one aspect of the present invention, in the lithium transition metal oxide represented by Formula $Li_xM_yN_{1-y}O_{2-\alpha}A_\beta$, the element represented by M is combination of three elements of Ni, Co, Mn; the element represented by N is one or more of Mg, Al, Ti, B, V, Mo, W, Ni, Co, Mn, Y, Ce. The element represented by N can easily enter the crystal structure of the lithium transition metal oxide and improve the structural stability thereof.

According to one aspect of the present invention, the element represented by M in the lithium transition metal oxide represented by Formula $Li_xM_yN_{1-y}O_{2-\alpha}A_\beta$ is combination of $Ni_{1/3}Co_{1/3}Mn_{1/3}$, $Ni_{0.5}Co_{0.2}Mn_{0.3}$, $Ni_{0.6}Co_{0.2}Mn_{0.2}$ and $Ni_{0.8}Co_{0.1}Mn_{0.1}$. The combination of $Ni_{1/3}Co_{1/3}Mn_{1/3}$, $Ni_{0.5}Co_{0.2}Mn_{0.3}$, $Ni_{0.6}Co_{0.2}Mn_{0.2}$ and $Ni_{0.8}Co_{0.1}Mn_{0.1}$ has high structure symmetry. The lithium transition metal oxide containing the combination as previously described has desirable cycling performance.

According to one aspect of the present invention, in the lithium transition metal oxide represented by Formula $Li_xM_yN_{1-y}O_{2-\alpha}A_\beta$, the element represented by M is Ni and/or Co, the element represented by N is one or more of Mg, Al, Ti, B, V, Mo, W, Ni, Co, Mn, Y, Ce, $0.7 \leq y \leq 1.0$. In this case, the element represented by N can improve structural stability of the positive active material during delithiation and insertion of lithium ions.

According to one aspect of the present invention, the element represented by M in the lithium transition metal oxide represented by Formula $Li_xM_yN_{1-y}O_{2-\alpha}A_\beta$ is selected from a group consisting of Co, $Ni_{0.5}Co_{0.5}$, $Ni_{0.7}Co^{0.3}$, $Ni_{0.8}Co_{0.2}$, $Ni_{0.8}Co_{0.1}$. In this case, the lithium transition metal oxide has desirable cycling performance.

According to one aspect of the present invention, the element represented by N in the lithium transition metal oxide represented by Formula $Li_xM_yN_{1-y}O_{2-\alpha}A_\beta$ is one or more of Mg, Al, Ti, Mo, Zr, B, V, Ce, W, $0.95 \leq y \leq 1.0$. In this case, the positive active material can be readily to be synthesized.

According to one aspect of the present invention, the element represented by N in the lithium transition metal oxide represented by Formula $Li_xM_yN_{1-y}O_{2-\alpha}A_\beta$ is one or more of Mg, Al, Ti, Mo, Zr, B, V, Ce, W, $0.99 \leq y \leq 1.0$. In this case, the positive active material has high specific capacity due to the reduction of element without electrovalence change in the core.

According to one aspect of the present invention, the element represented by A in the lithium transition metal oxide represented by Formula $Li_xM_yN_{1-y}O_{2-\alpha}A_\beta$ is N or F, $0 \leq \beta \leq 0.1$. In this case, the positive active material has desirable thermal stability and the secondary lithium battery has desirable safety performance.

According to one aspect of the present invention, the element represented by N' in the lithium transition metal silicate represented by Formula $x'Li_2O \cdot y'N'O_a \cdot SiO_{2-\lambda}B_\zeta$ is one or more of the element represented by M and/or N in the lithium transition metal oxide represented by Formula $Li_xM_yN_{1-y}O_{2-\alpha}A_\beta$.

According to one aspect of the present invention, the element represented by B in the lithium transition metal silicate represented by Formula $x'Li_2O \cdot y'N'O_a \cdot SiO_{2-\lambda}B_\zeta$ is N, F, $0 \leq \zeta \leq 0.2$.

According to one aspect of the present invention, in the lithium transition metal silicate represented by Formula $x'Li_2O \cdot y'N'O_a \cdot SiO_{2-\lambda}B_\zeta$, $0.1 \leq x' \leq 1$, $0.2 \leq y' \leq 1.0$.

According to one aspect of the present invention, in the lithium transition metal silicate represented by Formula $x'Li_2O \cdot y'N'O_a \cdot SiO_{2-\lambda}B_\zeta$, a=1.0, x'=1, y'=1. The coating layer of $Li_2O \cdot N'O \cdot SiO_{2-\lambda}B_\zeta$ has desirable ion conductivity.

According to one aspect of the present invention, in the lithium transition metal silicate represented by Formula $x'Li_2O \cdot y'N'O_a \cdot SiO_{2-\lambda}B_\zeta$, a=1.5, x'=0.5, y'=1. In this case, the coating layer of $0.5Li_2O \cdot N'O_{1.5} \cdot SiO_{2-\lambda}B_\zeta$ has desirable ion conductivity.

According to one aspect of the present invention, in the lithium transition metal silicate represented by Formula $x'Li_2O \cdot y'N'O_a \cdot SiO_{2-\lambda}B_\zeta$, a=2, x'=1, y'=1. The coating layer of $Li_2O \cdot N'O_2 \cdot SiO_{2-\lambda}B_\zeta$ has desirable ion conductivity and structural stability.

According to one aspect of the present invention, the lithium transition metal silicate represented by Formula $x'Li_2O \cdot y'N'O_a \cdot SiO_{2-\lambda}B_\zeta$ is a mixture of $Li_2O \cdot N'O \cdot SiO_{2-\lambda}B_\zeta$, $0.5Li_2O \cdot N'O_{1.5} \cdot SiO_{2-\lambda}B_\zeta$ and $Li_2O \cdot N'O_2 \cdot SiO_{2-\lambda}B_\zeta$.

According to one aspect of the present invention, the thickness of the lithium transition metal silicate represented by Formula $x'Li_2O \; y'N'O_a \cdot SiO_{2-\lambda}B_\zeta$ is 0.1 nm~500 nm, or preferably 1 nm~300 nm The coating layer can conduct lithium ions and can hardly conduct electronics. If the thickness of the coating layer is more than 500 nm, the positive active material has poor electrochemical activity due to increase of conductivity of the material. If the thickness of the coating layer is less than 0.1 nm, the coating layer cannot coat the core.

According to one aspect of the present invention, a mass content of the lithium transition metal silicate represented by Formula $x'Li_2O.y'N'O_a.SiO_{2-\lambda}B_\xi$ in the total positive active material is about 0.01%~30%, and preferably 0.1%~5.0%.

According to one aspect of the present invention, a method for preparing a positive active material is provided. The method includes the steps of: preparing the core of lithium transition metal oxide represented by Formula $Li_xM_yN_{1-y}O_{2-\alpha}A_\beta$, adding Si source; and obtaining the positive active material comprising the core of lithium transition metal oxide represented by Formula $Li_xM_yN_{1-y}O_{2-\alpha}A_\beta$ and the coating layer of the lithium transition metal silicate represented by Formula $x'Li_2O.y'N'O_a.SiO_{2-\lambda}B_\xi$ in-situ formed on the core via sintering.

According to one aspect of the present invention, the Si source of the lithium transition metal silicate represented by Formula $x'Li_2O\ .y'N'O_a.SiO_{2-\lambda}B_\xi$ is one or more of elementary substance Si, $SiO_2$, SiO, $H_4SiO_4$, $H_2SiO_3$, $Li_4SiO_4$, $Li_2SiO_3$, $LiHSiO_3$, silicate ester, sub acid ester and a compound containing Si and at least two elements selected from a group consisting of Li, C, H, O, N.

According to one aspect of the present invention, the method for preparing a positive active material includes the steps of:

1) preparing the core of lithium transition metal oxide represented by Formula $Li_xM_yN_{1-y}O_{2-\alpha}A_\beta$: preparing intermediates of oxide, hydroxide and carbonate via one of solid milling method, liquid coprecipitation method, sol-gel method, combustion method, solvothermal method, Pechini method; mixing the intermediates of oxide, hydroxide or carbonate of transition metal with lithium source and material containing element represented by A, or only adding lithium source; and sintering the mixture at 600~1200° C. or preferably at 700-900° C.; or, obtaining mixture containing lithium and transition metal via one of solid milling method, liquid coprecipitation method, sol-gel method, combustion method, solvothermal method, Pechini method; and sintering the mixture at 600~1200° C. or preferably at 700-900° C.;

2) adding a material containing Si source and element represented by B into the core of lithium transition metal oxide represented by Formula $Li_xM_yN_{1-y}O_{2-\alpha}A_\beta$ or only adding a material containing Si source into the core of lithium transition metal oxide represented by Formula $Li_xM_yN_{1-y}O_{2-\alpha}A_\beta$: uniformly dispersing the material containing Si source or containing Si source and element represented by B in the core represented by Formula $Li_xM_yN_{1-y}O_{2-\alpha}A_\beta$ via one of solid milling method, sol-gel method, liquid phase mixing method, vapor deposition method; and 3) solid phase sintering the mixture in step 2) at 400~1200° C., or preferably at 500~900° C., and obtaining the positive active material comprising the core of lithium transition metal oxide represented by Formula $Li_xM_yN_{1-y}O_{2-\alpha}A_\beta$ and the coating layer of lithium transition metal silicate represented by Formula $x'Li_2O.y'N'O_a.SiO_{2-\lambda}B_\xi$ in situ formed on the core.

Compared with the prior art, according to one embodiment of the present invention, the method for preparing positive active material can in situ form coating layer of lithium transition metal silicate represented by Formula $x'Li_2O.y'N'O_a.SiO_{2-\lambda}B_\xi$ on the core of lithium transition metal oxide represented by Formula $Li_xM_yN_{1-y}O_{2-\alpha}A_\beta$. The coating layer can be uniformly formed on the surface of the core. Compared with prior art coating method, the coating content of the coating layer of the positive active material according to the present invention can be controlled precisely. In addition, the method of the present invention is readily to be realized, readily to be carried out in industrial production, and maintain the properties of the lithium transition metal oxides. The positive active material prepared according to the method of the present invention has high capacity, desirable cycling performance and desirable safety performance.

According to one embodiment of the present invention, a secondary lithium battery is provided. The secondary lithium battery includes a positive electrode, a negative electrode and a separator between the positive electrode and the negative electrode, wherein the positive electrode includes the positive active material as previously described.

According to one aspect of the present invention, the cut-off voltage of the secondary lithium battery is 4.1-4.7V.

Examples of the present invention will now be described more fully hereinafter, in which some, but not all examples of the invention are shown. Indeed, the invention may be embodied in many different forms and should not be construed as limited to the examples as set forth herein; rather, these examples are provided so that this disclosure will satisfy applicable legal requirements.

DETAILED DESCRIPTION OF VARIOUS EMBODIMENTS

EXAMPLE 1

The positive active material of Example 1 includes a core of $Li_{1.07}Ni_{0.1}Co_{0.5}Mn_{0.4}O_2$ obtained via coprecipitation method and 0.5 wt % of coating layer of $0.5Li_2O.0.1NiO.0.5CoO_{3/2}.0.3MnO_{3/2}.0.1MnO_2.SiO_2$ having a thickness of 100-200 nm.

The method for preparing the positive active material of Example 1 includes the steps of:

Dissolving $NiSO_4$, $CoSO_4$, $MnSO_4$ at an atom ratio of 0.1:0.5:0.4 in deionized water and obtaining a mixed solution of 1 mol/L; adding 1 mol/L NaOH solution in the mixed solution, fully stirring the mixed solution and maintaining the temperature at 75° C., and obtaining loose coprecipitate after full reaction; repeatedly washing the coprecipitate with deionized water and ethanol; sintering the washed coprecipitate in air at 500° C. for 5 hours; fully mixing the sintered coprecipitate with $LiOH.H_2O$ and sintering the mixture of coprecipitate and $LiOH.H_2O$ in air at 900° C. for 10 hours, and obtaining the core of $Li_{1.07}Ni_{0.1}Co_{0.5}Mn_{0.4}O_2$.

Mixing nano $SiO_2$ with the core of $Li_{1.07}Ni_{0.1}Co_{0.5}Mn_{0.4}O_2$ at a mass ratio of 0.0025:1; milling the mixture of nano $SiO_2$ and the core of $Li_{1.07}Ni_{0.1}Co_{0.5}Mn_{0.4}O_2$ in a planetary ball mill having a rotation speed of 300 r/min for 5 hours; sintering the fully milled mixture of nano $SiO_2$ and the core of $Li_{1.07}Ni_{0.1}Co_{0.5}Mn_{0.4}O_2$ in air at 750° C. for 10 hours and obtaining a positive active material including a core of $Li_{1.07}Ni_{0.1}Co_{0.5}Mn_{0.4}O_2$ and a coating layer of $0.5Li_2O.0.1NiO.0.5CoO_{3/2}.0.3MnO_{3/2}.0.1MnO_2.SiO_2$.

EXAMPLE 2

The positive active material of Example 2 includes a core of $Li_{1.10}Ni_{1/3}Co_{1/3}Mn_{1/3}O_2$ obtained via coprecipitation method and 0.01 wt % of coating layer of $0.55Li_2O.1/3NiO.1/3CoO_{3/2}.1/3MnO_2.SiO_2$ having a thickness of 100-500 nm coated on the core.

The method for preparing the positive active material of Example 2 includes the steps of:

Dissolving $NiSO_4$, $CoSO_4$, $MnSO_4$ at an atom ratio of 1.0:1.0:1.0 in deionized water and obtaining a mixed solution of 1 mol/L; adding 1 mol/L NaOH solution into the mixed solution, fully stirring the mixed solution and maintaining the temperature at 75° C., and obtaining loose coprecipitate after full reaction; repeatedly washing the coprecipitate with deionized water and ethanol; sintering the washed coprecipitate in air at 500° C. for 5 hours; fully mixing the sintered coprecipitate with $LiOH.H_2O$ and sintering the mixture of coprecipitate and $LiOH.H_2O$ in air at 900° C. for 20 hours, and obtaining the core of $Li_{1.10}Ni_{1/3}Co_{1/3}Mn_{1/3}O_2$.

Mixing $Li_2SiO_3$ and the core of $Li_{1.10}Ni_{1/3}Co_{1/3}Mn_{1/3}O_2$ at a mass ratio of 0.0001:1; milling the mixture of $Li_2SiO_3$ and the core of $Li_{1.10}Ni_{1/3}Co_{1/3}Mn_{1/3}O_2$ in a planetary ball mill having a rotation speed of 300 r/min for 5 hours; sintering the fully milled mixture of $Li_2SiO_3$ and the core of $Li_{1.10}N_{1/3}Co_{1/3}Mn_{1/3}O_2$ in air at 550° C. for 10 hours and obtaining a positive active material including the core of $Li_{1.10}Ni_{1/3}Co_{1/3}Mn_{1/3}O_2$ and the coating layer of $0.55Li_2O.1/3NiO.1/3CoO_{3/2}.1/3MnO_2.SiO_2$.

EXAMPLE 3

The positive active material of Example 3 includes a core of $Li_{1.05}Ni_{0.5}Co_{0.2}Mn_{0.3}O_2$ obtained via combustion method and 30.0 wt % of coating layer of $0.54Li_2O.0.3NiO.0.2NiO_{3/2}.0.2CoO_{3/2}.0.3MnO_2.SiO_2$ having a thickness of 50-80 nm coated on the core.

The method for preparing the positive active material of Example 3 includes the steps of:

Dissolving lithium nitrate, nickel nitrate, cobalt nitrate, manganese nitrate at an atom ratio of 1.07:0.50:0.20:0.30 in ethanol in a container and obtaining a mixed solution; adding glycerol into the mixed solution after lithium nitrate, nickel nitrate, cobalt nitrate and manganese nitrate being fully dissolved, the ratio of glycerol to the total metal ions is 3:1; stirring the mixed solution in the contained in a water bath at 80° C. to evaporate the ethanol; moving the container to a resistance furnace and heating after the ethanol being fully evaporated, until the residue of the mixed solution fully combusting; collecting the combustion product and sintering the combustion products in air at 750° C. for 5 hours and obtaining the core of $Li_{1.05}Ni_{0.5}Co_{0.2}Mn_{0.3}O_2$;

Dissolving $H_4SiO_4$ and $Li_{1.05}Ni_{0.5}Co_{0.2}Mn_{0.3}O_2$ at a mass ratio of 0.19:1 in 500 mL deionized water in a container and obtaining a mixed solution; after $H_4SiO_4$ and $Li_{1.05}Ni_{0.5}Co_{0.2}Mn_{0.3}O_2$ being fully dissolved, moving the container having the mixed solution to a water bath at 80° C. and stirring to evaporate the water; moving the container into an oven at 160° C. for 5 hours and obtaining black powder; sintering the black powder in air at 650° C. for 10 hours, and obtaining a positive active material including the core of $Li_{1.05}Ni_{0.5}Co_{0.2}Mn_{0.3}O_2$ and the coating layer of $0.54Li_2O.0.3NiO.0.2NiO_{3/2}.0.2CoO_{3/2}.0.3MnO_2.SiO_2$.

EXAMPLE 4

The positive active material of Example 4 includes a core of $Li_{1.20}Ni_{0.5}Co_{0.2}Mn_{0.29}Zr_{0.01}O_{1.98}F_{0.04}$ obtained via sol gel method and 3.0 wt % of coating layer of $0.53Li_2O.0.3NiO.0.2NiO_{3/2}.0.2CoO_{3/2}.0.3MnO_2.0.01ZrO_2.SiO_{1.98}F_{0.04}$ having a thickness of 100-200 nm coated on the core.

The method for preparing the positive active material of Example 4 includes the steps of:

Dissolving lithium acetate, nickel acetate, cobalt acetate, manganese acetate, nano titanium dioxide, ammonium fluoride at an atom ratio of 1.23:0.50:0.20:0.29:0.01:0.04 in deionized water in a container and obtaining a mixed solution; adding citric acid into the mixed solution after lithium acetate, nickel acetate, cobalt acetate, manganese acetate, nano-titanium dioxide, ammonium fluoride being fully dissolved, the ratio of citric acid to the total metal ions is 2:1; stirring the mixed solution in the container in a water bath at 85° C. to evaporate the water and obtaining gelatinous substance; moving the container to an oven at a 160° C. and heating for 5 hours, and obtaining brown-black substance; milling the brown-black substance into powder, sintering the powder in air at 750° C. for 25 hours and obtaining the core of $Li_{1.20}Ni_{0.5}Co_{0.2}Mn_{0.29}Zr_{0.01}O_{1.98}F_{0.04}$;

Dissolving orthosilicate ester and $Li_{1.20}Ni_{0.5}Co_{0.2}Mn_{0.29}Zr_{0.01}O_{1.98}F_{0.04}$ at a mass ratio of 0.0268:1 in 500 mL alcohol in a container and obtaining a mixed solution; setting the container having the mixed solution in a water bath at 70° C. and stirring to evaporate the alcohol and the orthosilicate ester; placing the container in an oven at 160° C. for 5 hours and obtaining black powder; sintering the black powder in air at 850° C. for 10 hours, and obtaining a positive active material including the core of $Li_{1.20}Ni_{0.5}Co_{0.2}Mn_{0.29}Zr_{0.01}O_{1.98}F_{0.04}$ and a coating layer of $0.53Li_2O.0.3NiO.0.2NiO_{3/2}.0.2CoO_{3/2}.0.3MnO_2.0.01ZrO_2.SiO_{1.98}F_{0.04}$.

EXAMPLE 5

The positive active material of Example 5 includes a core of $Li_{0.98}Ni_{0.6}Co_{0.18}Mn_{0.2}Ti_{0.02}O_2$ obtained via coprecipitation method and 0.40 wt % of coating layer of $0.49Li_2O.0.2NiO.0.4Ni_{3/2}.0.18CoO_{3/2}.0.2MnO_2.0.02TiO_2.SiO_2$ having a thickness of 10-15 nm.

The method for preparing the positive active material of Example 5 includes the steps of:

Dissolving $NiSO_4$, $CoSO_4$, $MnSO_4$, nano $TiO_2$ at an atom ratio of 0.60:0.18:0.20:0.02 in deionized water and obtaining a mixed solution of 1 mol/L; adding 1 mol/L NaOH solution into the mixed solution, fully stirring the mixed solution and maintaining the temperature at 75° C., and obtaining loose coprecipitate after full reaction; washing the coprecipitate with deionized water and ethanol repeatedly; sintering the washed coprecipitate in air at 500° C. for 5 hours; fully mixing the sintered coprecipitate with $Li_2CO_3$ and sintering the mixture of the sintered coprecipitate and $Li_2CO_3$ in air at 750° C. for 10 hours, and obtaining a core of $Li_{0.98}Ni_{0.6}Co_{0.18}Mn_{0.2}Mn_{0.02}O_2$.

Mixing $SiO_2$ with the core of $Li_{0.98}Ni_{0.6}Co_{0.18}Mn_{0.2}Ti_{0.02}O_2$ at a mass ratio of 0.002:1; milling the mixture of $SiO_2$ and the core of $Li_{0.98}Ni_{0.6}Co_{0.18}Mn_{0.2}Ti_{0.02}O_2$ in a planetary ball mill having a rotation speed of 500 r/min for 5 hours; sintering the fully milled mixture in air at 900° C. for 2 hours and obtaining a positive active material including the core of $Li_{0.98}Ni_{0.6}Co_{0.18}Mn_{0.2}Ti_{0.02}O_2$ and the coating layer of $0.49Li_2O.0.2NiO.0.4Ni_{3/2}.0.18CoO_{3/2}.0.2MnO_2.0.02TiO_2.SiO_2$.

EXAMPLE 6

The positive active material of Example 6 includes a core of $Li_{0.92}Ni_{0.75}Co_{0.15}Mn_{0.1}O_2$ obtained via Pechini method and 0.35 wt % of coating layer of $0.45Li_2O.0.1NiO.0.65NiO_{3/2}.0.15CoO_{3/2}.0.1MnO_2.SiO_2$ having a thickness of 15-20 nm.

The method for preparing the positive active material of Example 6 includes the steps of:

Dissolving $LiNO_3$, $NiNO_3$, $CoNO_3$, $MnNO_3$ at an atom ratio of 0.94:0.75:0.15:0.10 in deionized water in a container and obtaining a metal ion solution having a metal ion concentration of 1 mol/L; dissolving citric acid in polyethylene glycol and obtaining a citric acid solution of 1.5 mol/L; mixing the metal ion solution and the citric acid solution at a ratio of 2:1, and heating the container having the mixture of the metal ion solution and the citric acid solution in an oil bath at 130° C. until the mixture in the container turning into black sticky substance; moving the container into a Muffle furnace and prefiring at 300° C. for 5 hours; milling the prefired product into powder, sintering the powder in air at 800° C. for 10 hours, and obtaining the core of $Li_{0.92}Ni_{0.75}Co_{0.15}Mn_{0.1}O_2$ Mixing $SiO_2$ with the core of $Li_{0.92}Ni_{0.75}Co_{0.15}Mn_{0.1}O_2$ at a mass ratio of 0.0023:1; milling the mixture of $SiO_2$ and the core of $Li_{0.92}Ni_{0.75}Co_{0.15}Mn_{0.1}O_2$ in a planetary ball mill having a rotation speed of 500 r/min for 5 hours; sintering the fully milled mixture in air at 600° C. for 2 hours and obtaining a positive active material including the core of $Li_{0.92}Ni_{0.75}Co_{0.15}Mn_{0.1}O_2$ and the coating layer of $0.45Li_2O.0.1NiO0.65NiO_{3/2}.0.15CoO_{3/2}.0.1MnO_2.SiO_2$.

EXAMPLE 7

The positive active material of Example 7 includes a core of $Li_{1.02}Ni_{0.8}Co_{0.1}Mn_{0.1}O_2$ obtained via coprecipitation method and 0.50 wt % of coating layer of $0.51Li_2O.0.09NiO.0.63NiO_{3/2}.0.09CoO_{3/2}.0.09MnO_2.0.1V_2O_5.SiO_2$ having a thickness of 40-50 nm.

The method for preparing the positive active material of Example 7 includes the steps of:

Dissolving $NiSO_4$, $CoSO_4$, $MnSO_4$ at an atom ratio of 0.80:0.10:0.10 in deionized water and obtaining a mixed solution of 1 mol/L; adding 1 mol/L NaOH solution into the mixed solution, stirring the mixed solution and maintaining the temperature at 75° C., and obtaining loose coprecipitate after full reaction; washing the coprecipitate with deionized water and ethanol repeatedly; sintering the washed coprecipitate in air at 500° C. for 5 hours; fully mixing the sintered coprecipitate with $LiOH.H_2O$ and sintering the mixture of the coprecipitate and $LiOH.H_2O$ in air at 900° C. for 20 hours, and obtaining the core of $Li_{1.02}Ni_{0.8}Co_{0.1}Mn_{0.1}O_2$.

Milling $SiO_2$, $NH_4VO_3$ and the core of $Li_{1.02}Ni_{0.8}Co_{0.1}Mn_{0.1}O_2$ at a mass ratio of 0.0045:0.0004:1 in a planetary ball mill having a rotation speed of 300 r/min for 5 hours; sintering the fully milled mixture of $SiO_2$, $NH_4VO_3$ and the core of $Li_{1.02}Ni_{0.8}Co_{0.1}Mn_{0.1}O_2$ in air at 750° C. for 10 hours and obtaining a positive active material including the core of $Li_{1.02}Ni_{0.8}Co_{0.1}Mn_{0.1}O_2$ and the coating layer of $0.51Li_2O.0.09NiO.0.63NiO_{3/2}.0.09CoO_{3/2}.0.09MnO_2.0.1V_2O_5.SiO_2$.

EXAMPLE 8

The positive active material of Example 8 includes a core of $Li_{1.06}Ni_{0.82}Co_{0.10}Mn_{0.07}Zr_{0.004}Mg_{0.002}Ti_{0.004}O_2$ obtained via coprecipitation method and 0.25 wt % of coating layer of $0.531Li_2O.0.07NiO.0.75NiO_{3/2}.0.1CoO_{3/2}.0.07MnO_2.0.004ZrO_2.0.002MgO_2.0.1TiO_2.SiO_2$ having a thickness of 12-15 nm.

The method for preparing the positive active material of Example 8 includes the steps of:

Dissolving $NiSO_4$, $CoSO_4$, $MnSO_4$ at an atom ratio of 0.82:0.10:0.07 in deionized water and obtaining a mixed solution having a concentration of 1 mol/L; adding 1 mol/L NaOH solution into the mixed solution and stirring, and maintaining the temperature at 75° C.; obtaining loose coprecipitate after full reaction; washing the coprecipitate with deionized water and ethanol repeatedly; mixing the washed red coprecipitate with $Li_2CO_3$, nano $ZrO_2$, nano MgO, nano$TiO_2$ in an inclined mixer having a rotation speed of 50 r/min for 5 hours; sintering the mixture of the washed coprecipitate, $Li_2CO_3$, nano $ZrO_2$, nano MgO and nano$TiO_2$ in air at 800° C. for 5 hours, and obtaining the core of $Li_{1.07}Ni_{0.82}Co_{0.10}Mn_{0.07}Zr_{0.004}Mg_{0.002}Ti_{0.004}O_2$.

Dissolving methyl silicate and $Li_{1.07}Ni_{0.82}Co_{0.10}Mn_{0.07}Zr_{0.004}Mg_{0.002}Ti_{0.004}O_2$ at a mass ratio of 0.0035:1 in 500 mL alcohol in a container and obtaining a mixed solution after fully dissolution; adding 1 mol citric acid into the mixed solution after full dissolution of the methyl silicate, setting the container having the mixed solution in a water bath at 70° C. and stirring to evaporate the alcohol; placing the container in an oven at 160° C. for 5 hours and obtaining black powder; sintering the black powder in air at 650° C. for 5 hours, and obtaining a positive active material including the core of $Li_{1.07}Ni_{0.82}Co_{0.10}Mn_{0.07}Zr_{0.004}Mg_{0.002}Ti_{0.004}O_2$ and the coating layer of $0.531Li_2O.0.07NiO.0.75NiO_{3/2}.0.1CoO_{3/2}.0.07MnO_2.0.004ZrO_2.0.002MgO_2.0.1TiO_2.SiO_2$.

EXAMPLE 9

The positive active material of Example 9 includes a core of $Li_{0.97}Ni_{0.9}Co_{0.05}Mn_{0.04}Mg_{0.01}O_2$ obtained via coprecipitation method and 0.15 wt % of coating layer of $0.5Li_2O.0.04NiO.0.86NiO_{3/2}.0.05CoO_{3/2}.0.04MnO_2.0.01MgO.SiO_2$ having a thickness of 8-10 nm.

The method for preparing the positive active material of Example 9 includes the steps of:

Dissolving $NiSO_4$, $CoSO_4$, $MnSO_4$ at an atom ratio of 0.9:0.05:0.04 in deionized water and obtaining a mixed solution having a concentration of 1 mol/L; adding 1 mol/L NaOH solution into the mixed solution and stirring, while maintaining the temperature at 70° C.; obtaining loose coprecipitate after full reaction; washing the coprecipitate with deionized water and ethanol repeatedly; mixing the coprecipitate with nano MgO in an inclined mixer having a rotation speed of 50 r/min for 5 hours; mixing the mixture of the coprecipitate and nano MgO with $LiOH.H_2O$, sintering the mixture in air at 800° C. for 10 hours, and obtaining the core of $Li_{0.97}Ni_{0.9}Co_{0.05}Mn_{0.04}Mg_{0.01}O_2$.

Mixing $H_4SiO_4$ with the core of $Li_{0.97}Ni_{0.9}Co_{0.05}Mn_{0.04}Mg_{0.01}O_2$ at a mass ratio of 0.0011:1; milling the mixture of the core of $Li_{0.97}Ni_{0.9}Co_{0.05}Mn_{0.04}Mg_{0.01}O_2$ and $H_4SiO_4$ in a planetary ball mill having a rotation speed of 500 r/min for 5 hours; sintering the milled mixture of $H_4SiO_4$ and the core of $Li_{0.97}Ni_{0.9}Co_{0.05}Mn_{0.04}Mg_{0.01}O_2$ in air at 600° C. for 2 hours and obtaining a positive active material including the core of $Li_{0.97}Ni_{0.9}Co_{0.05}Mn_{0.04}Mg_{0.01}O_2$ and the coating layer of $0.5Li_2O.0.04NiO.0.86NiO_{3/2}.0.05CoO_{3/2}.0.04MnO_2.0.01MgO.SiO_2$.

EXAMPLE 10

The positive active material of Example 10 includes a core of $Li_{1.08}Ni_{1/3}Co_{1/3}Mn_{1/3}O_2$ obtained via solid milling method and 17.0 wt % of coating layer of $0.54Li_2O.1/3NiO.1/3CoO_{3/2}.1/3MnO_2.SiO_2$ having a thickness of 20-50 nm.

The method for preparing the positive active material of Example 10 includes the steps of:

Mixing $Li_2CO_3$, nickel oxalate, cobalt oxalate, $MnCO_3$ at a molar ratio of 0.56:1.0:1.0:1.0 in a zirconia sander having a rotation speed of 1000 r/min for 5 hours, the diameter of the zirconia milling media is 3 mm, and the ratio of zirconia milling media to the mixture of $Li_2CO_3$, nickel oxalate, cobalt oxalate and $MnCO_3$ is 1:1; removing the zirconia milling media and sintering the remained mixture in air at 750° C. for 5 hours and obtaining the core of $Li_{1.08}Ni_{1/3}Co_{1/3}Mn_{1/3}O_2$.

Dissolving TEOS and the core of $Li_{1.08}Ni_{1/3}Co_{1/3}Mn_{1/3}O_2$ at a mass ratio of 0.1030:1 in 500 mL alcohol in a container and obtaining a mixed solution after TEOS and the core of $Li_{1.08}Ni_{1/3}Co_{1/3}Mn_{1/3}O_2$ being fully hydrolyzed; setting the container having the mixed solution in a water bath at 70° C. and stirring so as to evaporate the alcohol; placing the container in an oven at 180° C. for 5 hours and obtaining black powder; sintering the black powder in air at 850° C. for 6 hours, and obtaining a positive active material including the core of $Li_{1.08}Ni_{1/3}Co_{1/3}Mn_{1/3}O_2$ and the coating layer of $0.54Li_2O.1/3NiO.1/3CoO_{3/2}.1/3MnO_2.SiO_2$.

EXAMPLE 11

The positive active material of Example 11 includes a core of $Li_{1.04}Ni_{0.5}CO_{0.2}Mn_{0.28}Zr_{0.02}O_{1.98}F_{0.04}$ obtained via coprecipitation and solid milling method and 2.0 wt % of a coating layer of $0.52Li_2O.0.28NiO.0.22NiO_{3/2}.0.2CoO_{3/2}.0.28MnO_2.0.02ZrO_2.SiO_{1.98}F_{0.04}$ having a thickness of 180-200 nm.

The method for preparing the positive active material of Example 11 includes the steps of:

Dissolving $NiSO_4$, $CoSO_4$, $MnSO_4$ at an atom ratio of 0.50:0.20:0.28 in deionized water and obtaining a mixed solution having a concentration of 1 mol/L; adding 1 mol/L NaOH solution into the mixed solution and stirring, while maintaining the temperature at 70° C.; obtaining loose coprecipitate after full reaction; washing the coprecipitate with deionized water and ethanol repeatedly; mixing the washed coprecipitate with $LiOH.H_2O$, nano $ZrO_2$ and $NH_4F$ in a zirconia sander having a rotation speed of 800 r/min and mixing for 5 hours, the diameter of the zirconia milling media is 3 mm, and the ratio of the zirconia milling media to the mixture of the washed coprecipitate and $LiOH.H_2O$, nano $ZrO_2$, $NH_4F$ is 1:1; removing the zirconia milling media and sintering the remained mixture in air at 950° C. for 24 hours and obtaining the core of $Li_{1.04}Ni_{0.5}Co_{0.2}Mn_{0.28}Zr_{0.02}O_{1.98}F_{0.04}$.

Mixing nano $SiO_2$ with the core of $Li_{1.04}Ni_{0.5}Co_{0.2}Mn_{0.28}Zr_{0.02}O_{1.98}F_{0.04}$ at a mass ratio of 0.0200:1; milling the mixture of $SiO_2$ and the core of $Li_{1.04}Ni_{0.5}Co_{0.2}Mn_{0.28}Zr_{0.02}O_{1.98}F_{0.04}$ in an inclined mixer having a rotation speed of 50r/min for 10 hours; sintering the fully milled mixture in air at 750° C. for 6 hours and obtaining a positive active material including the core of $Li_{1.04}Ni_{0.5}Co_{0.2}Mn_{0.28}Zr_{0.02}O_{1.98}F_{0.04}$ and the coating layer of $0.52Li_2O.0.28NiO.0.22NiO_{3/2}.0.2CoO_{3/2}.0.28MnO_2.0.02ZrO_2.SiO_{1.98}F_{0.04}$.

EXAMPLE 12

The positive active material of Example 12 includes a core of $Li_{1.05}Ni_{0.5}Co_{0.2}Mn_{0.28}Zr_{0.02}O_{1.98}F_{0.04}$ obtained via sol-gel method and 2.0 wt % coating layer of $0.53Li_2O.0.28NiO.0.22NiO_{3/2}.0.2CoO_{3/2}.0.28MnO_2.0.02ZrO_2.SiO_{1.98}N_{0.01}$ having a thickness of 8-10 nm.

The method for preparing the positive active material of Example 12 includes the steps of:

Dissolving lithium acetate, nickel acetate, cobalt acetate, manganese acetate, nano titanium dioxide, ammonium fluoride at an atom ratio of 1.07:0.50:0.20:0.28:0.02:0.04 in deionized water in a container and obtaining a mixed solution; adding citric acid into the mixed solution after lithium acetate, nickel acetate, cobalt acetate, manganese acetate, nano titanium dioxide, ammonium fluoride being fully dissolved, the ratio of citric acid to the total metal ions is 2:1; stirring the mixed solution in the container in a water bath at 85° C., to evaporate the water and obtain gelatinous substance; placing the container in an oven at 160° C. for 5 hours, and obtaining brown-black substance; milling the brown-black substance in a zirconia sander having a rotation speed of 800 r/min for 5 hours, the diameter of the zirconia milling media is 2 mm, and the ratio of the zirconia milling media to the brown-black substance is 1:1; removing the zirconia milling media and sintering the remaining brown-black substance in air at 750° C. for 5 hours and obtaining the core of $Li_{1.05}Ni_{0.5}Co_{0.2}Mn_{0.28}Zr_{0.02}O_{1.98}F_{0.04}$.

Dissolving TEOS and the core of $Li_{1.05}Ni_{0.5}Co_{0.2}Mn_{0.28}Zr_{0.02}O_{1.98}F_{0.04}$ at a mass ratio of 0.0480:1 in 500 mL glycol in a container and obtaining a mixed solution; setting the container having the mixed solution in a 800 L PTFE sealing container and placing and sealing the container in a stainless steel housing; placing the container in an oven at 175° C. for 5 hours and obtaining black powder; sintering the black powder in a mixed atmosphere of nitrogen and ammonia air at 550° C. for 10 hours, and obtaining a positive active material including the core of $Li_{1.05}Ni_{0.5}Co_{0.2}Mn_{0.28}Zr_{0.02}O_{1.98}F_{0.04}$ and the coating layer of $0.53Li_2O.0.28NiO.0.22NiO_{3/2}.0.2CoO_{3/2}.0.28MnO_2.0.02ZrO_2.SiO_{1.98}N_{0.01}$.

EXAMPLE 13

The positive active material of Example 13 includes a core of $Li_{1.05}Ni_{0.8}Co_{0.1}Mn_{0.1}O_{1.98}N_{0.01}$ obtained via solid milling method and 7.0 wt % of coating layer of $0.52Li_2O.0.1NiO.0.7NiO_{3/2}.0.1CoO_{3/2}.0.1MnO_2.SiO_2$ having a thickness of 20-30 nm.

The method for preparing the positive active material of Example 13 includes the steps of:

Milling $Li_2CO_3$, nickel oxalate, cobalt oxalate, $MnCO_3$, urea at a molar ratio of 0.53:0.8:0.1:0.1:0.15 in a zirconia sander having a rotation speed of 1000 r/min for 5 hours, the diameter of the zirconia milling media is 5 mm, and the ratio of the zirconia milling media to the mixture of $Li_2CO_3$, nickel oxalate, cobalt oxalate, $MnCO_3$, urea is 1:2; removing the zirconia milling media and sintering the remaining mixture in air at 750° C. for 5 hours and obtaining the core of $Li_{1.05}Ni_{0.8}Co_{0.1}Mn_{0.1}O_{1.98}N_{0.01}$.

Placing the core of $Li_{1.05}Ni_{0.8}Co_{0.1}Mn_{0.1}O_{1.98}N_{0.01}$ in a tube furnace at 500° C.; adopting nitrogen having a flow rate of 1 L/min as carrier gas; introducing a toluene solution having 0.2 mol/L TEOS into the tube furnace, to deposit TEOS on the surface of the core of $Li_{1.05}Ni_{0.8}Co_{0.1}Mn_{0.1}O_{1.98}N_{0.01}$; sintering the core of $Li_{1.05}Ni_{0.8}Co_{0.1}Mn_{0.1}O_{1.98}N_{0.01}$ having TEOS deposited thereon in air at 700° C. for 5 hours, and obtaining a positive active material including the core of $Li_{1.05}Ni_{0.8}Co_{0.1}Mn_{0.1}O_{1.98}N_{0.01}$ and the coating layer of $0.52Li_2O.0.1NiO.0.7NiO_{3/2}.0.1CoO_{3/2}.0.1MnO_2.SiO_2$.

EXAMPLE 14

The positive active material of Example 14 includes a core of $Li_{1.08}Ni_{1/3}Co_{1/3}Mn_{1/3}O_2$ obtained via coprecipitation method and 0.10 wt % of coating layer of $0.54Li_2O.1/3NiO.1/3CoO_{3/2}.1/3MnO_2.SiO_2$ having a thickness of 200-300 nm.

The method for preparing the positive active material of Example 14 includes the steps of:

Dissolving $NiSO_4$, $CoSO_4$, $MnSO_4$ at an atom ratio of 1.0:1.0:1.0 in deionized water and obtaining a mixed solution having a concentration of 1 mol/L; adding 1 mol/L NaOH solution into the mixed solution and stirring, as well as maintaining the temperature at 75° C.; obtaining loose coprecipitate after full reaction; washing the coprecipitate with deionized water and ethanol repeatedly; sintering the washed coprecipitate in air at 500° C. for 5 hours and obtaining secondary particles of oxide or hydroxide A; milling nickel oxalate, cobalt oxalate, $MnCO_3$ at a molar ratio of 1.0:1.0:1.0 in a zirconia sander having a rotation speed of 1000 r/min for 5 hours, the diameter of the zirconia milling media is 5 mm, and the ratio of zirconia milling media to the mixture of nickel oxalate, cobalt oxalate, $MnCO_3$ is 1:1; removing the zirconia milling media and sintering the remaining mixture in air at 700° C. for 5 hours and obtaining oxide or hydroxide or carbonate B of the primary particles; mixing A and B, and mixing the mixture f A and B with $LiOH.H_2O$, sintering the mixture of A, B and $LiOH.H_2O$ in air at 800° C. for 5 hours, and obtaining the core of $Li_{1.08}Ni_{1/3}Co_{1/3}Mn_{1/3}O_2$.

Sintering the mixture of $SiO_2$ and the core of $Li_{1.08}Ni_{1/3}Co_{1/3}Mn_{1/3}O_2$ at a mass ratio of 0.0005:1 in air at 700° C. for 10 hours and obtaining a positive active material including the core of $Li_{1.08}Ni_{1/3}Co_{1/3}Mn_{1/3}O_2$ and a coating layer of $0.54Li_2O.1/3NiO.1/3CoO_{3/2}.1/3MnO_2.SiO_2$.

EXAMPLE 15

The positive active material of Example 15 includes a core of $Li_{1.03}Ni_{0.8}Co_{0.1}Mn_{0.1}O_2$ obtained via coprecipitation method and 0.5 wt % of coating layer of $0.52Li_2O.0.1NiO.0.7NiO_{3/2}.0.1CoO_{3/2}.0.1MnO_2.SiO_2$ having a thickness of 15-20 nm.

The method for preparing the positive active material of Example 15 includes the steps of:

Dissolving $NiSO_4$, $CoSO_4$, $MnSO_4$ at an atom ratio of 0.80:0.10:0.10 in deionized water and obtaining a mixed solution having a concentration of 1 mol/L; adding 1 mol/L NaOH solution into the mixed solution and stirring, as well as maintaining the temperature at 70° C.; obtaining loose coprecipitate after full reaction; washing the coprecipitate with deionized water and ethanol repeatedly; fully mixing the washed coprecipitate with $LiOH.H_2O$ and sintering the mixture of the coprecipitate and $LiOH.H_2O$ in air at 850° C. for 10 hours, and obtaining the core of $Li_{1.03}Ni_{0.8}Co_{0.1}Mn_{0.1}O_2$.

Mixing and milling $H_4SiO_4$ with the core of $Li_{1.03}Ni_{0.8}Co_{0.1}Mn_{0.1}O_2$ at a mass ratio of 0.0034:1 in an inclined mixer having a rotation speed of 30 r/min for 10 hours; sintering the fully milled mixture in air at 850° C. for 6 hours and obtaining a positive active material including the core of $Li_{1.03}Ni_{0.8}Co_{0.1}Mn_{0.1}O_2$ and the coating layer of $0.52Li_2O.0.1NiO..0.7NiO_{3/2}.0.1CoO_{3/2}.0.1MnO_2.SiO_2$.

EXAMPLE 16

The positive active material of Example 16 includes a core of $Li_{1.04}Ni_{0.8}Co_{0.1}Mn_{0.1}O_2$ obtained via coprecipitation method and 0.7 wt % of coating layer of $0.52Li_2O.0.1NiO.0.7NiO_{3/2}.0.1CoO_{3/2}.0.1MnO_2.SiO_2$ having a thickness of 15-20 nm.

The method for preparing the positive active material of Example 16 includes the steps of:

Dissolving $NiSO_4$, $CoSO_4$, $MnSO_4$ at an atom ratio of 0.8:0.1:0.1 in deionized water and obtaining a mixed solution having a concentration of 1 mol/L; adding 1 mol/L NaOH solution into the mixed solution and stirring, and maintaining the temperature at 70° C.; obtaining loose coprecipitate after full reaction; washing the coprecipitate with deionized water and ethanol repeatedly; sintering the washed coprecipitate in air at 850° C. for 10 hours; fully mixing the sintered coprecipitate with $LiOH.H_2O$ and sintering the mixture of the coprecipitate and $LiOH.H_2O$ in air at 850° C. for 10 hours, and obtaining the core of $Li_{1.04}Ni_{0.8}Co_{0.1}Mn_{0.1}O_2$.

Mixing and milling $H_4SiO_4$ with the core of $Li_{1.04}Ni_{0.8}Co_{0.1}Mn_{0.1}O_2$ at a mass ratio of 0.0060:1 in a planetary ball mill having a rotation speed of 500 r/min for 5 hours; sintering the fully milled mixture in air at 500° C. for 2 hours and obtaining a positive active material including the core of $Li_{1.04}Ni_{0.8}Co_{0.1}Mn_{0.1}O_2$ and the coating layer of $0.52Li_2O.0.1NiO.0.7NiO_{3/2}.0.1CoO_{3/2}.0.1MnO_2.SiO_2$.

EXAMPLE 17

The positive active material of Example 17 includes a core of $Li_{1.05}CoO_2$ obtained via coprecipitation method and 0.01 wt % of a coating layer of $0.53Li_2O.CoO_{3/2}.SiO_2$ having a thickness of 50~100 nm.

The method for preparing the positive active material of Example 17 includes the steps of:

Preparing 1 mol/L $CoSO_4$ solution; slowly dripping 1 mol/L $NH_4HCO_3$ solution at a dripping rate of 1 L/h into the $CoSO_4$ solution; after coprecipitation, filtering and washing the coprecipitate with deionized water, and obtaining $CoCO_3$ after drying; mixing $Li_2CO_3$ and $CoCO_3$ at a molar ratio of 1.07:1 in a planetary ball mill having a rotation speed of 200 r/min for 5 hours; sintering the fully mixed mixture of $Li_2CO_3$ and $CoCO_3$ in air at 900° C. for 10 hours;

Adding $H_4SiO_4$ and the sintered product in a container having 500 mL alcohol; heating the container in a water bath at 75° C. and stirring to evaporate the alcohol; placing the container in an oven at 180° C. for 5 hours, and obtaining black powder; sintering the black powder in air at 650° C. for 6 hours, and obtaining a positive active material including the core of $Li_{1.05}CoO_2$ and the coating layer of $0.53Li_2O.CoO_{3/2}.SiO_2$.

EXAMPLE 18

The positive active material of Example 18 includes a core of $Li_{1.01}CoO_{0.89}Mg_{0.05}Al_{0.04}Ti_{0.02}O_2$ obtained via sol-gel method and 0.4 wt % of coating layer of $0.51Li_2O.0.89CoO_{3/2}.0.05MgO.0.04AlO_{3/2}.0.02TiO_2.SiO_2$ having a thickness of 15~20 nm. The core of $Li_{1.01}Co_{0.89}Mg_{0.05}Al_{0.04}Ti_{0.02}O_2$ is consisted of monocrystalline particles.

The method for preparing the positive active material of Example 18 includes the steps of:

Dissolving lithium acetate, cobalt acetate, nano magnesia, nano alumina and nano titanium dioxide at a metal atom ratio of 1.03:0.89:0.05:0.04:0.02 in deionized water in a container and obtaining a mixed solution; adding citric acid into the mixed solution after lithium acetate, cobalt acetate, nano magnesia, nano alumina and nano titanium dioxide being fully dissolved, the ratio of citric acid to the total metal ions is 2:1; stirring the mixed solution in the container in a water bath at 85° C., to evaporate the water and obtain gelatinous substance; placing the container in an oven at 160° C. for 5 hours and obtaining brown-black substance; milling the brown-black substance into powder, sintering the powder in air at 900° C. for 24 hours and obtaining the core of $Li_{1.01}CoO_{0.89}Mg_{0.05}Al_{0.04}Ti_{0.02}O_2$;

Dispersing the core of $Li_{1.01}Co_{0.89}Mg_{0.05}Al_{0.04}Ti_{0.02}O_2$ in 0.2% $H_4SiO_4$ solution having a concentration of 500 g/L and obtaining a mixed solution; placing the mixed solution in water bath of 85° C., to evaporate the water and obtain gelatinous substance; sintering the gelatinous substance in air at 750° C. for 5 hours, and obtaining a positive active material including the core of $Li_{1.01}Co_{0.89}Mg_{0.05}Al_{0.04}Ti_{0.02}O_2$ and the coating layer of $0.51Li_2O.0.89CoO_{3/2}.0.05MgO.0.04AlO_{3/2}.0.02TiO_2.SiO_2$.

EXAMPLE 19

The positive active material of Example 19 includes a core of $Li_{0.98}Co_{0.6}Al_{0.38}Ti_{0.02}O_2$ obtained via coprecipitation method and 2.00 wt % of coating layer of $0.49Li_2O.0.6CoO_{3/2}.0.38AlO_{3/2}.0.02TiO_2.SiO_2$ having a thickness of 100~150 nm. The core of $Li_{0.98}Co_{0.6}Al_{0.38}Ti_{0.02}O_2$ is consisted of monocrystalline particles.

The method for preparing the positive active material of Example 19 includes the steps of:

Preparing 1 mol/L $CoSO_4$ solution; slowly dripping 1 mol/L $NH_4HCO_3$ solution at a dripping rate of 1 L/h into the $CoSO_4$ solution; after coprecipitation, filtering and washing the coprecipitate with deionized water, obtaining $CoCO_3$ after drying; mixing $Li_2CO_3$, $CoCO_3$, nano $Al_2O_3$ and nano $TiO_2$ at a molar ratio of 1.01:0.60:0.38:0.02 in a planetary ball mill having a rotation speed of 200 r/min for 5 hours; sintering the fully mixed mixture of $Li_2CO_3$, $CoCO_3$, nano $Al_2O_3$ and nano $TiO_2$ in air at 800° C. for 18 hours;

Mixing and milling $SiO_2$ with the sintered mixture above at a mass ratio of 0.01:1 in a planetary ball mill having a rotation speed of 300 r/min for 5 hours; sintering the fully milled mixture in air at 750° C. for 10 hours and obtaining a positive active material including the core of $Li_{0.98}Co_{0.6}Al_{0.8}Ti_{0.02}O_2$ and the coating layer of $0.49Li_2O.0.6CoO_{3/2}.0.38AlO_{3/2}.0.02TiO_2.SiO_2$.

EXAMPLE 20

The positive active material of Example 20 includes a core of $Li_{1.02}Ni_{0.85}Co_{0.10}Al_{0.05}O_2$ obtained via coprecipitation method and 0.45 wt % of coating layer of $0.51Li_2O.0.85NiO_{3/2}.0.1CoO_{3/2}.0.05AlO_{3/2}.SiO_2$ having a thickness of 15~20 nm.

The method for preparing the positive active material of Example 20 includes the steps of:

Dissolving $NiSO_4$, $CoSO_4$, $Al(NO_3)_3$ at an atom ratio of 0.85:0.10:0.05 in deionized water and obtaining a mixed solution having a concentration of 1 mol/L; adding 1 mol/L NaOH solution into the mixed solution and stirring, and maintaining the temperature at 75° C. and dripping ammonia into the mixed solution to maintain the pH value at 10.6; obtaining loose coprecipitate after full reaction; washing the coprecipitate with deionized water and ethanol repeatedly; sintering the washed coprecipitate in air at 500° C. for 5 hours; fully mixing the sintered coprecipitate with $LiOH.H_2O$ and sintering the mixture of the coprecipitate and $LiOH.H_2O$ in air at 750° C. for 10 hours, and obtaining a core of $Li_{1.02}Ni_{0.85}Co_{0.10}Al_{0.05}O_2$.

Mixing and milling $SiO_2$ with the core of $Li_{1.02}Ni_{0.85}Co_{0.10}Al_{0.05}O_2$ at a mass ratio of 0.0025:1 in a planetary ball mill having a rotation speed of 300 r/min for 5 hours; sintering the fully milled mixture in air at 750° C. for 10 hours and obtaining a positive active material including the core of $Li_{1.02}Ni_{0.85}Co_{0.10}Al_{0.05}O_2$ and the coating layer of $0.51Li_2O.0.85NiO_{3/2}.0.1CoO_{3/2}.0.05AlO_{3/2}.SiO_2$.

EXAMPLE 21

The positive active material of Example 21 includes a core of $Li_{1.05}Ni_{0.90}Co_{0.08}Al_{0.02}O_2$ obtained via sol-gel method and 2.5 wt % of coating layer of $0.53Li_2O.0.9NiO_{3/2}.0.08CoO_{3/2}.0.02AlO_{3/2}.SiO_2$ having a thickness of 100~150 nm.

The method for preparing the positive active material of Example 21 includes the steps of:

Dissolving lithium acetate, nickel acetate, cobalt acetate, aluminum nitrate at an atom ratio of 1.09:0.90:0.08:0.02 in deionized water in a container and obtaining a mixed solution; adding citric acid into the mixed solution after lithium acetate, nickel acetate, cobalt acetate, aluminum nitrate being fully dissolved, the ratio of citric acid to the total metal ions is 2:1; stirring the mixed solution in the container in a water bath at 85° C. to evaporate the water and obtain gelatinous substance; placing the container in an oven at 160° C. for 5 hours, and obtaining brown-black substance; milling the brown-black substance into powder, sintering the powder in air at 750° C. for 5 hours and obtaining the core of $Li_{1.05}Ni_{0.90}Co_{0.08}Al_{0.02}O_2$;

Dispersing the sintered core of $Li_{1.05}Ni_{0.90}Co_{0.08}Al_{0.02}O_2$ in 0.8% orthosilicate solution at a concentration of 500 g/L and obtaining a mixed solution; setting the mixed solution in water bath of 85° C. to evaporate the water and obtain gelatinous substance; sintering the gelatinous substance in air at 750° C. for 5 hours, and obtaining a positive active material including the core of $Li_{1.05}Ni_{0.90}Co_{0.08}Al_{0.02}O_2$ and the coating layer of $0.53Li_2O.0.9NiO_{3/2}.0.08CoO_{3/2}.0.02AlO_{3/2}.SiO_2$.

EXAMPLE 22

The positive active material of Example 22 includes a core of $Li_{1.09}Ni_{0.88}Co_{0.10}Al_{0.01}Ti_{0.01}O_2$ obtained via sol-gel method and 0.80 wt % of coating layer of $0.55Li_2O.0.88NiO_{3/2}.0.1CoO_{3/2}.0.01AlO_{3/2}.0.01TiO_2.SiO_2$ having a thickness of 50~80 nm.

The method for preparing the positive active material of Example 22 includes the steps of:

Dissolving lithium acetate, nickel acetate, cobalt acetate, aluminum nitrate, nano titanium dioxide at an atom ratio of 1.11:0.88:0.10:0.01:0.01 in deionized water in a container and obtaining a mixed solution; adding citric acid into the mixed solution after lithium acetate, nickel acetate, cobalt acetate, aluminum nitrate, nano titanium dioxide being fully dissolved, the ratio of citric acid to the total metal ions is 2:1; stirring the mixed solution in the container in a water bath at 85° C. to evaporate the water and obtain gelatinous substance; placing the container in an oven at 160° C. for 5 hours and obtaining brown-black substance; milling the brown-black substance into powder, sintering the powder in air at 750° C. for 5 hours and obtaining the core of $Li_{1.09}Ni_{0.88}Co_{0.10}Al_{0.01}Ti_{0.01}O_2$;

Dispersing the sintered core of $Li_{1.09}Ni_{0.88}Co_{0.10}Al_{0.01}Ti_{0.01}O_2$ in 0.3% silicic acid solution having a concentration of 500 g/L and obtaining a mixed solution; placing the solution in a water bath of 85° C. to evaporate the water and obtain gelatinous substance; sintering the gelatinous substance in air at 600° C. for 18 hours, and obtaining a positive active material including the core of $Li_{1.09}Ni_{0.88}Co_{0.10}Al_{0.01}Ti_{0.01}O_2$ and the coating layer of $0.55Li_2O.0.88NiO_{3/2}.0.1CoO_{3/2}.0.01AlO_{3/2}.0.01TiO_2.SiO_2$.

EXAMPLE 23

The positive active material of Example 23 includes a core of $Li_{0.98}Ni_{0.50}Mn_{0.50}O_2$ obtained via solvothermal method and 2.10 wt % of coating layer of $0.49Li_2O.0.5NiO.0.5MnO_2.SiO_2$ having a thickness of 80~100 nm.

The method for preparing the positive active material of Example 23 includes the steps of:

Dissolving nickel acetate and manganese acetate at an atom ratio of 0.50:0.50 in deionized water in a container and obtaining a mixed solution; adding sodium persulfate in the mixed solution after nickel acetate and manganese acetate being fully dissolved in the deionized water, with the ratio of sodium persulfate to the metal ions being 2:1; placing the container containing mixed solution in a PTFE airtight container, placing the container in a stainless steel housing, and putting the container enclosed by the housing in an oven at 135° C. and reacting for 24 hours; after cooling down, washing the reaction product with deionized water repeatedly; sintering the mixture of the washed reaction product and $LiOH.H_2O$ in air at 750° C. for 10 hours, and obtaining the core of $Li_{0.98}Ni_{0.50}Mn_{0.50}O_2$.

Dispersing the sintered core powder of $Li_{0.98}Ni_{0.50}Mn_{0.50}O_2$ in 0.8% orthosilicate solution having a concentration of 500 g/L and obtaining a mixed solution; setting the mixed solution in a water bath of 85° C. to evaporate the water and obtain gelatinous substance; sintering the gelatinous substance in air at 800° C. for 20 hours, and obtaining a positive active material including the core of $Li_{0.98}Ni_{0.50}Mn_{0.50}O_2$ and the coating layer of $0.49Li_2O.0.5NiO.0.5MnO_2.SiO_2$.

EXAMPLE 24

The positive active material of Example 24 includes a core of $Li_{1.07}Ni_{0.80}Mn_{0.20}O_2$ obtained via coprecipitation method and 0.05 wt % of coating layer of $0.54Li_2O.0.2NiO.0.6NiO_{3/2}.0.2MnO_2.SiO_2$ having a thickness of 100~150 nm.

The method for preparing the positive active material of Example 24 includes the steps of:

Dissolving $NiSO_4$ and $MnSO_4$ at an atom ratio of 0.80:0.20 in deionized water and obtaining a mixed solution having a concentration of 1 mol/L; adding 1 mol/L NaOH solution into the mixed solution and stirring, and maintaining the temperature at 75° C.; dripping ammonia into the mixed solution to control the pH value of the mixed solution at 10.3; obtaining loose coprecipitate after full reaction; washing the coprecipitate with deionized water and ethanol repeatedly; sintering the washed coprecipitate in air at 500° C. for 5 hours and obtaining second particles consisting of primary particles having an average size of 400-600 nm; fully mixing the sintered coprecipitate with $LiOH.H_2O$ and sintering the mixture of the coprecipitate and $LiOH.H_2O$ in air at 750° C. for 10 hours, and obtaining the core of $Li_{1.07}Ni_{0.80}Mn_{0.20}O_2$.

Mixing and milling $SiO_2$ with the core of $Li_{1.07}Ni_{0.80}Mn_{0.20}O_2$ at a mass ratio of 0.0003:1 in a planetary ball mill having a rotation speed of 300 r/min for 5 hours; sintering the fully milled mixture in air at 750° C. for 10 hours and obtaining a positive active material including the core of $Li_{1.07}Ni_{0.80}Mn_{0.20}O_2$ and the coating layer of $0.54Li_2O.0.2NiO.0.6NiO_{3/2}.0.2MnO_2.SiO_2$.

EXAMPLE 25

The positive active material of Example 25 includes a core of $Li_{1.04}Ni_{0.85}Mn_{0.12}Al_{0.03}O_2$ obtained via sol-gel method and 2.50 wt % of coating layer of $0.52Li_2O.0.12NiO.0.73NiO_{3/2}.0.12MnO_2.0.03AlO_{3/2}.SiO_2$ having a thickness of 20~40 nm.

The method for preparing the positive active material of Example 25 includes the steps of:

Dissolving lithium acetate, nickel acetate, manganese acetate, aluminum nitrate at an atom ratio of 1.07:0.85:0.12:0.03 in deionized water in a container and obtaining a mixed solution; adding citric acid into the mixed solution after lithium acetate, nickel acetate, manganese acetate, aluminum nitrate being fully dissolved, with the ratio of citric acid to the total metal ions being 2:1; setting the container having the mixed solution in a water bath of 85° C. to evaporate the water and obtain gelatinous substance; placing the container in an oven at 160° C. for 5 hours, and obtaining brown-black substance; milling the brown-black substance into powder, and sintering the powder in air at 750° C. for 5 hours and obtaining the core of $Li_{1.04}Ni_{0.85}Mn_{0.12}Al_{0.03}O_2$;

Dispersing the sintered core powder of $Li_{1.04}Ni_{0.85}Mn_{0.12}Al_{0.03}O_2$ in 0.8% silicic acid solution having a concentration of 500 g/L and obtaining a mixed solution; setting the mixed solution in a water bath of 85° C. to evaporate the water and obtain gelatinous substance; sintering the gelatinous substance in air at 600° C. for 20 hours, and obtaining a positive active material including the core of $Li_{1.04}Ni_{0.85}Mn_{0.12}Al_{0.03}O_2$ and the coating layer of $0.52Li_2O.0.12NiO.0.73NiO_{3/2}.0.12MnO_2.0.03AlO_{3/2}.SiO_2$.

COMPARATIVE EXAMPLE 1

The positive active material of Comparative Example 1 includes a core of $Li_{1.09}Ni_{0.1}Co_{0.5}Mn_{0.4}O_2$ obtained via coprecipitation method and 0.03 wt % of coating layer of $Al_2O_3$ having a thickness of 50-100 nm.

The method for preparing the positive active material of Comparative Example 1 includes the steps of:

Dissolving $NiSO_4$, $CoSO_4$, $MnSO_4$ at an atom ratio of 0.1:0.5:0.4 in deionized water and obtaining a mixed solution having a concentration of 1 mol/L; adding 1 mol/L NaOH solution into the mixed solution and stirring, and maintaining the temperature at 75° C.; obtaining loose coprecipitate after full reaction; washing the coprecipitate with deionized water and ethanol repeatedly; sintering the washed coprecipitate in air at 500° C. for 5 hours; fully mixing the sintered coprecipitate with $LiOH.H_2O$ and sintering the mixture of the coprecipitate and $LiOH.H_2O$ in air at 900° C. for 20 hours, and obtaining the core of $Li_{1.09}Ni_{0.1}Co_{0.5}Mn_{0.4}O_2$ consisting of secondary particles formed by primary particles having a particle size of 4.0-6.0 μm.

Mixing nano $Al_2O_3$ powder with the core of $Li_{1.09}Ni_{0.1}Co_{0.5}Mn_{0.4}O_2$ at a mass ratio of 0.003:0.97; milling the mixture of nano $Al_2O_3$ powder and the core of $Li_{1.09}Ni_{0.1}Co_{0.5}Mn_{0.4}O_2$ in a planetary ball mill having a rotation speed of 300 r/min for 5 hours; sintering the fully milled mixture in air at 900° C. for 10 hours and obtaining a positive active material including the core of $Li_{1.09}Ni_{0.1}Co_{0.5}Mn_{0.4}O_2$ the a coating layer of $Al_2O_3$.

COMPARATIVE EXAMPLE 2

The positive active material of Comparative Example 2 is $Li_{1.10}Ni_{1/3}Co_{1/3}Mn_{1/3}O_2$ obtained via coprecipitation method.

The method for preparing the positive active material of Comparative Example 2 includes the steps of:

Dissolving $NiSO_4$, $CoSO_4$, $MnSO_4$ at an atom ratio of 1.0:1.0:1.0 in deionized water and obtaining a mixed solution having a concentration of 1 mol/L; adding 1 mol/L NaOH solution into the mixed solution and stirring, and maintaining the temperature at 75° C.; obtaining loose coprecipitate after full reaction; washing the coprecipitate with deionized water and ethanol repeatedly; sintering the washed coprecipitate in air at 500° C. for 5 hours; fully mixing the sintered coprecipitate with $LiOH.H_2O$ and sintering the mixture of the coprecipitate and $LiOH.H_2O$ in air at 850° C. for 10 hours, and obtaining positive active material of $Li_{1.10}Ni_{1/3}Co_{1/3}Mn_{1/3}O_2$ consisting of secondary particles formed by primary particles having a particle size of 0.8-1.0 μm.

COMPARATIVE EXAMPLE 3

The positive active material of Comparative Example 3 is $Li_{1.08}Ni_{0.5}Co_{0.2}Mn_{0.3}O_2$ obtained via coprecipitation method.

The method for preparing the positive active material of Comparative Example 3 includes the steps of:

Dissolving $NiSO_4$, $CoSO_4$, $MnSO_4$ at an atom ratio of 5.0:2.0:3.0 in deionized water and obtaining a mixed solution having a concentration of 1 mol/L; adding 1 mol/L NaOH solution into the mixed solution and stirring, and maintaining the temperature at 75° C.; obtaining loose coprecipitate after full reaction; washing the coprecipitate with deionized water and ethanol repeatedly; sintering the washed coprecipitate in air at 500° C. for 5 hours; fully mixing the sintered coprecipitate with $LiOH.H_2O$ and sintering the mixture of the coprecipitate and $LiOH.H_2O$ in air at 800° C. for 10 hours, and obtaining the positive active material of $Li_{1.08}Ni_{0.5}Co_{0.2}Mn_{0.3}O_2$.

COMPARATIVE EXAMPLE 4

The positive active material of Comparative Example 4 is $Li_{0.98}Ni_{0.6}Co_{0.2}Mn_{0.2}O_2$ obtained via sol-gel method.

The method for preparing the positive active material of Comparative Example 4 includes the steps of:

Dissolving lithium acetate, nickel acetate, cobalt acetate, manganese acetate at an atom ratio of 0.99:0.60:0.20:0.20 in deionized water in a container and obtaining a mixed solution; adding citric acid into the mixed solution after lithium acetate, nickel acetate, cobalt acetate, manganese acetate being fully dissolved, with the ratio of citric acid to the total metal ions being 2:1; stirring the mixed solution in the container in a water bath of 85° C. to evaporate the water and obtain gelatinous substance; placing the container in an oven at 160° C. for 5 hours, and obtaining brown-black substance; milling the brown-black substance into powder, sintering the powder in air at 750° C. for 10 hours and obtaining the positive active material of $Li_{0.98}Ni_{0.6}Co_{0.2}Mn_{0.2}O_2$.

COMPARATIVE EXAMPLE 5

The positive active material of Comparative Example 5 includes a core of $Li_{0.9}Ni_{0.75}Co_{0.15}Mn_{0.1}O_2$ obtained via coprecipitation method and 0.05 wt % of coating layer of MgO having a thickness of 10-15 nm.

The method for preparing the positive active material of Comparative Example 5 includes the steps of:

Dissolving $NiSO_4$, $CoSO_4$, $MnSO_4$ at an atom ratio of 0.75:0.15:0.10 in deionized water and obtaining a mixed solution having a concentration of 1 mol/L; adding 1 mol/L NaOH solution into the mixed solution and stirring, and maintaining the temperature at 75° C.; obtaining loose coprecipitate after full reaction; washing the coprecipitate with deionized water and ethanol repeatedly; mixing the washed coprecipitate with $LiOH.H_2O$ and sintering the mixture of the washed coprecipitate an $LiOH.H_2O$ in air at 700° C. for 5 hours, and obtaining the core of $Li_{0.9}Ni_{0.75}Co_{0.15}Mn_{0.1}O_2$ consisting of secondary particles formed by primary particles having a particle size of 4.0-6.0 μm.

Mixing and milling nano MgO powder with the core of $Li_{0.9}Ni_{0.75}Co_{0.15}Mn_{0.1}O_2$ at a mass ratio of 0.0005:1 in a planetary ball mill having a rotation speed of 500 r/min for 5 hours; sintering the fully milled mixture in air at 900° C. for 10 hours and obtaining a positive active material including the core of $Li_{0.9}Ni_{0.75}Co_{0.15}Mn_{0.1}O_2$ and the coating layer of MgO.

COMPARATIVE EXAMPLE 6

The positive active material of Comparative Example 6 is $Li_{1.03}Ni_{0.8}Co_{0.1}Mn_{0.1}O_2$ obtained via coprecipitation method.

The method for preparing the positive active material of Comparative Example 6 includes the steps of:

Dissolving $NiSO_4$, $CoSO_4$, $MnSO_4$ at an atom ratio of 8.0:1.0:1.0 in deionized water and obtaining a mixed solution having a concentration of 1 mol/L; adding 1 mol/L NaOH solution into the mixed solution and stirring, and maintaining the temperature at 75° C.; obtaining loose coprecipitate after full reaction; washing the coprecipitate with deionized water and ethanol repeatedly; sintering the washed coprecipitate in air at 500° C. for 5 hours; fully mixing the sintered coprecipitate with $LiOH.H_2O$; sintering the mixture of sintered coprecipitate and $LiOH.H_2O$ in air at 900° C. for 8 hours, and obtaining the positive active material of $Li_{1.03}Ni_{0.8}Co_{0.1}Mn_{0.1}O_2$ consisting of secondary particles formed by primary particles having a particle size of 0.7-0.8 μm.

COMPARATIVE EXAMPLE 7

The positive active material of Comparative Example 7 includes a core of $Li_{1.07}Ni_{0.82}Co_{0.1}Mn_{0.08}O_2$ obtained via coprecipitation method and 0.12 wt % of coating layer of $AlPO_4$ having a thickness of 12-15 nm.

The method for preparing the positive active material of Comparative Example 7 includes the steps of:

Dissolving $NiSO_4$, $CoSO_4$, $MnSO_4$ at an atom ratio of 0.82:0.10:0.08 in deionized water and obtaining a mixed solution having a concentration of 1 mol/L; adding 1 mol/L NaOH solution into the mixed solution and stirring, and maintaining the temperature at 75° C.; obtaining loose coprecipitate after full reaction; washing the coprecipitate with deionized water and ethanol repeatedly; mixing the washed coprecipitate with $LiOH.H_2O$ and sintering the mixture of the washed coprecipitate and $LiOH.H_2O$ in air at 700° C. for 5 hours, and obtaining the core of $Li_{1.07}Ni_{0.82}Co_{0.1}Mn_{0.08}O_2$.

Mixing and milling nano $AlPO_4$ powder with the core of $Li_{1.07}Ni_{0.82}Co_{0.1}Mn_{0.08}O_2$ at a mass ratio of 0.0012:1 in a planetary ball mill having a rotation speed of 300 r/min for 5 hours; sintering the fully milled mixture in air at 800° C. for hours and obtaining a positive active material including the core of $Li_{1.07}Ni_{0.82}Co_{0.1}Mn_{0.08}O_2$ and the coating layer of $AlPO_4$.

COMPARATIVE EXAMPLE 8

The positive active material of Comparative Example 8 is $Li_{0.95}Ni_{0.9}Co_{0.05}Mn_{0.05}O_2$.

The method for preparing the positive active material of Comparative Example 8 includes the steps of:

Mixing $Li_2CO_3$, nickel oxalate, cobalt oxalate, $MnCO_3$ at a molar ratio of 0.49:0.90:0.05:0.05 in a zirconia sander having a rotation speed of 1000 r/min for 5 hours, the diameter of the zirconia milling media is 5 mm, and the ratio of zirconia milling media to the mixture of $Li_2CO_3$, nickel oxalate, cobalt oxalate, $MnCO_3$ is 1:2; removing the zirconia milling media and sintering the remaining mixture in air at 950° C. for 24 hours and obtaining the positive active material of $Li_{0.95}Ni_{0.9}Co_{0.05}Mn_{0.05}O_2$.

COMPARATIVE EXAMPLE 9

The positive active material of Comparative Example 9 is $Li_{1.05}CoO_2$ obtained via coprecipitation method.

The method for preparing the positive active material of Comparative Example 9 includes the steps of:

Preparing 1 mol/L $CoSO_4$ solution; slowly dripping 1 mol/L $NH_4HCO_3$ solution at a dripping rate of 1 L/h into the $CoSO_4$ solution; after coprecipitation, filtering and washing the coprecipite with deionized water and obtaining $CoCO_3$ after drying; mixing $Li_2CO_3$ and $CoCO_3$ at a molar ratio of 1.07:1 in a planetary ball mill having a rotation speed of 200 r/min for 5 hours; sintering the fully mixed mixture of $Li_2CO_3$ and $CoCO_3$ in air at 900° C. for 10 hours, and obtaining the positive active material $Li_{1.05}CoO_2$.

COMPARATIVE EXAMPLE 10

The positive active material of Comparative Example 10 is $Li_{1.01}Co_{0.89}Mg_{0.05}Al_{0.04}Ti_{0.02}O_2$ obtained via sol-gel method.

The method for preparing the positive active material of Comparative Example 10 includes the steps of:

Dissolving lithium acetate, cobalt acetate, nano magnesia, nano alumina, nano titanium dioxide at an atom ratio of 1.03:0.89:0.05:0.04:0.02 in deionized water in a container and obtaining a mixed solution; adding citric acid into the mixed solution after lithium acetate, cobalt acetate, nano magnesia, nano alumina, nano titanium dioxide being fully dissolved, the ratio of citric acid to the total metal ions is 2:1; stirring the solution in the container in a water bath of 85° C. to evaporate the water and obtain gelatinous substance; placing the container in an oven at 160° C. for 5 hours, and obtaining brown-black substance; milling the brown-black substance into powder, sintering the powder in air at 900° C. for 24 hours and obtaining the positive active material of $Li_{1.01}Co_{0.89}Mg_{0.05}Al_{0.04}Ti_{0.02}O_2$.

COMPARATIVE EXAMPLE 11

The positive active material of Comparative Example 11 is $Li_{0.98}Co_{0.98}Ti_{0.02}O_2$ obtained via coprecipitation method consisting of monocrystalline particles.

The method for preparing the positive active material of Comparative Example 11 includes the steps of:

Preparing 1 mol/L $CoSO_4$ solution; slowly dripping 1 mol/L $NH_4HCO_3$ solution at a dripping rate of 1 L/h into the $CoSO_4$ solution; after coprecipitation, filtering and washing the coprecipitate with the deionized water, and obtaining $CoCO_3$ after drying; mixing $Li_2CO_3$, $CoCO_3$ and $TiO_2$ at a molar ratio of 1.01:0.98:0.02 in a planetary ball mill having a rotation speed of 200 r/min for 5 hours; sintering the fully mixed mixture of $Li_2CO_3$, $CoCO_3$ and $TiO_2$ in air at 800° C. for 18 hours, and obtaining the positive active material of $Li_{0.98}Co_{0.98}Ti_{0.02}O_2$.

COMPARATIVE EXAMPLE 12

The positive active material of Comparative Example 12 is $Li_{1.02}Ni_{0.85}Co_{0.10}Al_{0.05}O_2$ obtained via coprecipitation method.

The method for preparing the positive active material of Comparative Example 12 includes the steps of:

Dissolving $NiSO_4$, $CoSO_4$, $Al(NO_3)_3$ at an atom ratio of 0.85:0.10:0.05 in deionized water and obtaining a mixed solution having a concentration of 1 mol/L; adding 1 mol/L NaOH solution into the mixed solution and stirring, and maintaining the temperature at 75° C.; dripping ammonia in the mixed solution to control the pH value of the mixed solution at 10.6; obtaining loose coprecipitate after full reaction; washing the coprecipitate with deionized water and ethanol repeatedly; sintering the washed coprecipitate in air at 500° C. for 5 hours; mixing the sintered coprecipitate with $LiOH.H_2O$ and sintering the mixture of the sintered coprecipitate and $LiOH.H_2O$ in air at 750° C. for 10 hours, and obtaining the positive active material of $Li_{1.02}Ni_{0.85}Co_{0.10}Al_{0.05}O_2$.

COMPARATIVE EXAMPLE 13

The positive active material of Comparative Example 13 is $Li_{1.05}Ni_{0.90}Co_{0.08}Al_{0.02}O_2$ obtained via sol-gel method.

The method for preparing the positive active material of Comparative Example 13 includes the steps of:

Dissolving lithium acetate, nickel acetate, cobalt acetate, aluminum nitrate at an atom ratio of 1.09:0.90:0.08:0.02 in deionized water in a container and obtaining a mixed solution; adding citric acid into the mixed solution after lithium acetate, nickel acetate, cobalt acetate, aluminum nitrate being fully dissolved, the ratio of the citric acid to the total metal ions is 2:1; stirring the mixed solution in the container in a water bath of 85° C. to evaporate the water and obtain gelatinous substance; placing the container in an oven at 160° C. for 5 hours, and obtaining brown-black substance; milling the brown-black substance into powder, sintering the powder in air at 750° C. for 5 hours and obtaining the positive active material of $Li_{1.05}Ni_{0.90}Co_{0.08}Al_{0.02}O_2$.

COMPARATIVE EXAMPLE 14

The positive active material of Comparative Example 14 is $Li_{1.09}Ni_{0.88}Co_{0.10}Al_{0.01}Ti_{0.01}O_2$ obtained via sol-gel method.

The method for preparing the positive active material of Comparative Example 14 includes the steps of:

Dissolving lithium acetate, nickel acetate, cobalt acetate, aluminum nitrate, nano titanium dioxide at an atom ratio of 1.11:0.88:0.10:0.01:0.01 in deionized water in a container and obtaining a mixed solution; adding citric acid into the mixed solution after lithium acetate, nickel acetate, cobalt acetate, aluminum nitrate, nano titanium dioxide being fully dissolved, the ratio of the citric acid to the total metal ions is 2:1; stirring the mixed solution in the container in a water bath of 85° C. to evaporate the water and obtain gelatinous substance; placing the container the gelatinous substance in an oven at 160° C. for 5 hours, and obtaining brown-black substance; milling the brown-black substance into powder, sintering the powder in air at 750° C. for 5 hours and obtaining the positive active material of $Li_{1.09}Ni_{0.88}Co_{0.10}Al_{0.01}Ti_{0.01}O_2$.

COMPARATIVE EXAMPLE 15

The positive active material of Comparative Example 15 is $Li_{0.98}Ni_{0.50}Mn_{0.50}O_2$ obtained via sol-gel method.

The method for preparing the positive active material of Comparative Example 15 includes the steps of:

Dissolving lithium acetate, nickel acetate, manganese acetate at an atom ratio of 1.02:0.50:0.50 in deionized water in a container and obtaining a mixed solution; adding citric acid into the mixed solution after lithium acetate, nickel acetate, manganese acetate being fully dissolved, the ratio of the citric acid to the total metal ions is 2:1; stirring the mixed solution in the container in a water bath of 85° C. to evaporate the water and obtain gelatinous substance; placing the container having the gelatinous substance in an oven at 160° C. for 5 hours, and obtaining brown-black substance; milling the brown-black substance into powder, sintering the powder in air at 750° C. for 5 hours and obtaining the positive active material of $Li_{0.98}Ni_{0.50}Mn_{0.50}O_2$.

COMPARATIVE EXAMPLE 16

The positive active material of Comparative Example 16 is $Li_{1.07}Ni_{0.80}Mn_{0.20}O_2$ obtained via coprecipitation method.

The method for preparing the positive active material of Comparative Example 16 includes the steps of:

Dissolving $NiSO_4$, $MnSO_4$ at an atom ratio of 0.80:0.20 in deionized water and obtaining a mixed solution having a concentration of 1 mol/L; adding 1 mol/L NaOH solution into the mixed solution and stirring, and maintaining the temperature at 75° C.; dripping ammonia in the mixed solution to control the pH value of the mixed solution at 10.3; obtaining loose coprecipitate after full reaction; washing the coprecipitate with deionized water and ethanol repeatedly; sintering the washed coprecipitate in air at 500° C. for 5 hours; fully mixing the sintered coprecipitate and $LiOH.H_2O$; sintering the mixture of the sintered coprecipitate and $LiOH.H_2O$ in air at 750° C. for 10 hours, and obtaining the positive active material of $Li_{1.07}Ni_{0.80}Mn_{0.20}O_2$.

COMPARATIVE EXAMPLE 17

The positive active material of Comparative Example 17 is $Li_{1.04}Ni_{0.85}Mn_{0.12}Al_{0.03}O_2$ obtained via sol-gel method.

The method for preparing the positive active material of Comparative Example 17 includes the steps of:

Dissolving lithium acetate, nickel acetate, manganese acetate, aluminum nitrate at an atom ratio of 1.07:0.85:0.12: 0.03 in deionized water in a container and obtaining a mixed solution; adding citric acid into the mixed solution after lithium acetate, nickel acetate, manganese acetate, aluminum nitrate being fully dissolved, the ratio of the citric acid to the total metal ions is 2:1; stirring the mixed solution in the container in a water bath of 85° C. to evaporate the water and obtain gelatinous substance; placing the container having the gelatinous substance in an oven at 160° C. for 5 hours, and obtaining brown-black substance; milling the brown-black substance into powder, sintering the powder in air at 750° C. for 5 hours and obtaining the positive active material of $Li_{1.04}Ni_{0.85}Mn_{0.12}Al_{0.03}O_2$.

PREPARATION OF LITHIUM ION BATTERIES

The positive active materials according to Examples 1 to 25, Comparative Examples 1 to 17 are adopted as positive active materials to manufacture lithium ion batteries via same process, to analyze the electrochemical performance of lithium-containing transition metal oxides. The method for preparing lithium ion batteries includes the following steps.

The positive active materials according to Examples 1 to 25, Comparative Examples 1 to 17 are adopted as the positive active materials of the positive plates, respectively. Artificial graphite is adopted as negative active material of the negative plate. The positive plate, the negative plate and the separator are winded to form a secondary lithium battery after soldering terminal, packaging the aluminum foil, filling electrolyte and pumping the air. The discharge cut-off voltage of each secondary lithium battery is 2.80 V. The charge cut-off voltage of each secondary lithium battery is 4.50 V (relative to the electric potential of lithium 4.55 V). The design capacity of each secondary lithium battery is 2500 mAh.

PERFORMANCE ANALYSIS

The performances of lithium ion batteries according to Examples 1 to 25 and Comparative Examples 1 to 17 are assessed and shown in Table 1.

1. Cycling performance: Each secondary lithium battery is charged at a constant current of 0.5 C (1225 mA) at 25° C. until the voltage reaches 4.50 V. Each secondary lithium battery is then charged at a constant voltage of 4.50 V until the current reaches 0.05 C (123 mA). Each secondary lithium battery is further discharged at a current of 0.5 C (1225 mA) until the voltage reaches 2.80 V. The charging and discharging cycle is repeated for 1000 times. The discharge capacity of the first cycle and the discharge capacity of the 1000th cycle are determined. The capacity retention rate of each secondary lithium battery is calculated according to the following formula:

The capacity retention rate=(discharge capacity of the 1000th cycle/discharge capacity of the first cycle)×100%

2. High temperature storage performance: Each secondary lithium battery is charged at a constant current of 0.5 C (1225 mA) at 25° C. until the voltage reaches 4.50V. Each secondary lithium battery is charged at a constant voltage of 4.50 V until the current reaches 0.05 C (123 mA). The thickness of each secondary lithium battery prior to storage and the first discharge capacity is determined. Each fully charged secondary lithium battery is stored in an oven at 60° C. for 100 days. The thickness of each secondary lithium battery after storage is determined. The expansion rate of each secondary lithium battery after storage is calculated. Each stored secondary lithium battery is charged at a constant current of 0.5 C (1225 mA) until the voltage reaches 4.50 V. Each secondary lithium battery is charged at a constant voltage of 4.50 V until the current reaches 0.05 C (123 mA). Each secondary lithium battery is discharged at a constant current of 0.5 C (1225 mA) until the voltage reaches 2.80 V. The charge and discharge cycle is repeated for five cycles. The final discharge capacity is recorded. The capacity retention rate relative to the first discharge capacity is calculated according to the following formula.

Expansion rate of a stored secondary lithium battery=(thickness of a stored secondary lithium battery thickness of a secondary lithium battery prior to storage)/ thickness of a secondary lithium battery prior to storage×100%.

Capacity retention rate of a stored secondary lithium battery=(discharge capacity after 100 days storage)/(discharge capacity of the first cycle)×100%.

3. Safety performance test: Each secondary lithium battery is charged at a constant current of 0.5 C (1225 mA) at 25° C. until the voltage reaches 4.50 V. Each secondary lithium battery is charged at a constant voltage of 4.50 V until the current reaches 0.05 C (123 mA). Each secondary lithium battery is disassembled in a glovebox full of Argon. The positive plate of each secondary lithium battery is taken out and washed in DMC solution. After the DMC has completely evaporated, the positive active material is scratched from the positive plate. 10 mg scratched positive active material of each secondary lithium battery is put in an aluminum crucible. The aluminum crucible is sealed after 0.1 μL electrolyte has been added. The scanning temperature of the DSC test is 50~500° C. and the heating rate is 10° C./min.

TABLE 1

Performance Test Results of lithium ion batteries according to Examples and Comparative Examples

| | Capacity retention rate of second lithium battery after cycling | Expansion rate of stored second lithium battery | Capacity retention rate of a stored second lithium battery | DSC heat release (J/g) | Maximum DSC Exothermic peak (□) |
|---|---|---|---|---|---|
| Example 1 | 83.40% | 4.60% | 87.20% | 651 | 299 |
| Example 2 | 91.70% | 5.10% | 87.10% | 641 | 321 |
| Example 3 | 82.30% | 7.30% | 83.10% | 793 | 311 |
| Example 4 | 90.40% | 2.70% | 89.10% | 802 | 308 |
| Example 5 | 76.20% | 11.50% | 86.10% | 810 | 260 |
| Example 6 | 83.15% | 4.60% | 87.00% | 821 | 271 |
| Example 7 | 81.40% | 9.20% | 81.30% | 891 | 247 |
| Example 8 | 80.10% | 11.95% | 81.20% | 893 | 257 |
| Example 9 | 70.20% | 4.20% | 76.10% | 951 | 226 |
| Example 10 | 86.20% | 3.25% | 90.10% | 630 | 336 |
| Example 11 | 84.30% | 4.25% | 86.80% | 810 | 309 |
| Example 12 | 85.90% | 2.60% | 89.90% | 768 | 312 |
| Example 13 | 81.90% | 6.20% | 84.30% | 782 | 277 |
| Example 14 | 95.70% | 1.20% | 94.10% | 620 | 327 |
| Example 15 | 84.40% | 3.90% | 87.60% | 930 | 249 |
| Example 16 | 85.30% | 4.05% | 89.80% | 910 | 254 |
| Example 17 | 73.10% | 10.10% | 82.40% | 1231 | 245 |
| Example 18 | 79.30% | 15.60% | 79.40% | 1160 | 239 |
| Example 19 | 77.90% | 11.10% | 85.10% | 1210 | 242 |
| Example 20 | 64.70% | 14.30% | 89.20% | 921 | 234 |
| Example 21 | 74.80% | 14.10% | 76.30% | 861 | 231 |
| Example 22 | 75.40% | 11.40% | 84.50% | 1127 | 234 |
| Example 23 | 80.30% | 8.10% | 91.40% | 731 | 282 |
| Example 24 | 89.10% | 15.30% | 85.00% | 810 | 247 |
| Example 25 | 75.20% | 15.30% | 87.20% | 870 | 259 |
| Comparative Example 1 | 78.10% | 5.10% | 81.00% | 693 | 295 |
| Comparative Example 2 | 75.30% | 7.30% | 84.20% | 657 | 315 |
| Comparative Example 3 | 65.70% | 12.20% | 73.80% | 851 | 290 |
| Comparative Example 4 | 52.20% | 23.60% | 65.20% | 860 | 270 |
| Comparative Example 5 | 61.20% | 12.2% | 67.50% | 852 | 266 |
| Comparative Example 6 | 56.80% | 30.70% | 65.70% | 971 | 232 |
| Comparative Example 7 | 58.10% | 25.10% | 71.30% | 954 | 238 |
| Comparative Example 8 | 55.60% | 20.50% | 63.50% | 1052 | 211 |
| Comparative Example 9 | 60.40% | 25.70% | 52.30% | 1391 | 214 |
| Comparative Example 10 | 65.00% | 32.70% | 41.20% | 1379 | 222 |
| Comparative Example 11 | 42.00% | 28.90% | 35.00% | 1381 | 221 |
| Comparative Example 12 | 56.70% | 29.00% | 70.60% | 1161 | 216 |
| Comparative Example 13 | 68.00% | 38.10% | 72.90% | 1263 | 221 |
| Comparative Example 14 | 69.30% | 24.40% | 70.60% | 1345 | 203 |
| Comparative Example 15 | 72.20% | 18.60% | 70.00% | 862 | 262 |
| Comparative Example 16 | 70.10% | 19.80% | 70.80% | 970 | 212 |
| Comparative Example 17 | 68.40% | 33.20% | 50.30% | 1051 | 221 |

It is clearly shown in Table 1 that:

1) The positive active material having a core of lithium transition metal oxide and a coating layer according to the present invention has remarkably improved charge-discharge cycle performance at 2.80 V~4.50 V. Comparing Examples 1 to 25 and Comparative Examples 1 to 17, after 1000 cycles, the positive active material having a core of lithium transition metal oxide and a coating layer according to the present invention has a higher capacity retention rate than that of ordinary lithium transition metal oxide positive active material. The positive active material having a core of lithium transition metal oxide and a coating layer has desirable cycling performance, especially the cycling performance at high voltage of 4.50 V, because the coating layer can stabilize the core and prevent phase change.

2) The positive active material having a core of lithium transition metal oxide and a coating layer according to the present invention has remarkably improved high temperature storage performance at 4.50 V. Comparing Examples 1 to 25 and Comparative Examples 1 to 17, the positive active material having a core of lithium transition metal oxide and a coating layer according to the present invention has a much lower thickness expansion rate after charged to 4.50 v and stored at 60° C. for 100 days than that of ordinary lithium transition metal oxide positive active material. The positive active material having a core of lithium transition metal oxide and a coating layer of the present invention has desirable cycling performance The high temperature storage performance at 4.50 v is improved remarkably, because the coating layer has higher chemical stability and higher electrochemical stability, which can remarkably reduce the catalytic activity of the positive active material.

3) The positive active material having a core of lithium transition lithium transition metal oxide and a coating layer according to the present invention has remarkably improved safety performance at 4.50 V. Comparing Examples 1 to 25 and Comparative Examples 1 to 17, when the secondary lithium battery using the positive active material having a core of lithium transition metal oxide and a coating layer according to the present invention is charged to 4.55 V, DSC exotherm of the secondary lithium battery is much less than that of a secondary lithium battery using ordinary lithium transition metal oxide positive active material. Silicate has stable crystal structure. The coating layer of silicate can improve the thermal stability of the positive active material and the safety performance of the secondary lithium battery. The coating layer in situ formed on the core can effectively eliminate the sites having high reactivity on the surface of the core, reduce the catalytic activity of the final product in the secondary lithium battery and, therefore, obtain stable positive active material.

Summarizing the above, the positive active material and method for preparing the same according to the present invention have the following advantages.

Firstly, the coating layer can conduct lithium ions. Compared with other coating layer of oxide, the coating layer according to the present invention has higher lithium-ion conductivity.

Secondly, the coating layer has stable chemical stability and electrochemical stability. Even after being charged to 4.70 V, the skeleton of silica-oxygen structure still can protect the core, which will remarkably reduce the catalytic activity of the core and improve the chemical stability of the positive active material. In addition, the silicate has stable crystal structure. The coating layer of silicate can improve the thermal stability of the positive active material, thereby improving the safety performance of the secondary lithium battery.

Thirdly, the coating layer is in-situ formed on the core. Part of the coating layer comes from the core. Therefore, the coating layer can be uniformly formed on the core.

Fourthly, the coating layer is apt to be formed on the sites having high reactivity of the core. The method according to the present invention can effectively eliminate the sites having high reactivity on the surface of the core, thereby reducing the catalytic activity of the final product in the secondary lithium battery and obtaining stable positive active material.

Fifthly, the method according to the present invention can reduce the oxidizing ability of the core in charging state. The $M^{4+}$ having strong oxidizing ability on the surface of the core is coated by the coating layer and cannot contact the electrolyte. Therefore, the $M^{4+}$ can hardly oxidize and decompose the electrolyte.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments, it should be appreciated that alternative embodiments without departing from the scope of the appended claims. Although specific terms are employed herein, they are used in a generic and descriptive sense only and not for purposes of limitation.

What is claimed is:

1. A positive active material for a secondary lithium battery, comprising:
   a core of lithium transition metal oxide represented by Formula $Li_xM_yN_{1-y}O_{2-\alpha}A_\beta$ and a coating layer of lithium transition metal silicate represented by Formula $x'Li_2O.y'N'O_a.SiO_{2-\lambda}B_\zeta$ which in-situ formed on the core,
   wherein element represented by M is at least one of Ni, Co and Mn; element represented by N and N' each is at least one of Na, K, Rb, Cs, Be, Mg, Ca, Sr, Ba, Ra, Al, Ga, In, Ge, Sn, Sc, Ti, B, V, Cr, Mn, Fe, Co, Ni, Cu, Zn, Y, Zr, Nb, Mo, W, Ru, Rh, Pd, Ag, Cd, La, Ce, Pr, Nd, Sm, Eu, Gd, Tb, Dy, Ho, Er, Tm, Yb, Lu; element represented by A and B each is at least one of N, F, P, S, Cl, Se; and $0.8 \leq x \leq 1.3$, $0.6 \leq y \leq 1.0$, $0.01 \leq x' \leq 2.1$, $0.2 \leq y' \leq 1.5$, $0.1 \leq a \leq 3.0$, $0 \leq \alpha \leq 0.2$, $0 \leq \beta \leq 0.4$, $0 \leq \lambda \leq 0.5$, $0 \leq \zeta \leq 0.5$.

2. The positive active material of claim 1, wherein in the lithium transition metal oxide represented by Formula $Li_xM_yN_{1-y}O_{2-\alpha}A_\beta$, the element represented by M is combination of elements Ni, Co, Mn; and the element represented by N is at least one of Mg, Al, Ti, B, V, Mo, W, Ni, Co, Mn, Y, Ce; $0.7 \leq y \leq 1.0$.

3. The positive active material of claim 2, wherein the element represented by M in the lithium transition metal oxide represented by Formula $Li_xM_yN_{1-y}O_{2-\alpha}A_\beta$ is Co, $Ni_{0.5}Co_{0.5}$, $Ni_{0.7}Co_{0.3}$, $Ni_{0.8}Co_{0.2}$, $Ni_{0.9}Co_{0.1}$, $Ni_{1/3}Co_{1/3}Mn_{1/3}$, $Ni_{0.5}Co_{0.2}Mn_{0.3}$, $Ni_{0.6}Co_{0.2}Mn_{0.2}$, $Ni_{0.8}Co_{0.01}Mn_{0.1}$ or combinations thereof.

4. The positive active material of claim 1, wherein the element represented by N in Formula $Li_xM_yN_{1-y}O_{2-\alpha}A_\beta$ is at least one of Mg, Al, Ti, B, Mo, Zr, V, Ce, W, and $0.95 \leq y \leq 1.0$.

5. The positive active material of claim 1, wherein the element represented by A in the lithium transition metal oxide represented by Formula $Li_xM_yN_{1-y}O_{2-\alpha}A_\beta$ is N and/or F, and $0 \leq \beta \leq 0.1$.

6. The positive active material of claim 1, wherein element represented by B in the lithium transition metal silicate represented by Formula $x'Li_2O.y'N'O_a.SiO_{2-\lambda}B_\zeta$ is N and/or F, and $0 \leq \zeta \leq 0.2$.

7. The positive active material of claim 1, wherein in the lithium transition metal silicate represented by Formula $x'Li_2O.y'N'O_a.SiO_{2-\lambda}B_\zeta$, $0.1 \le x' \le 1$, $0.2 \le y' \le 1.0$.

8. The positive active material of claim 1, wherein the coating layer of lithium transition metal silicate represented by Formula $x'Li_2O.y'N'O_a.SiO_{2-\lambda}B_\zeta$ is $Li_2O.N'O.SiO_{2-\lambda}B_\zeta$, $0.5Li_2O.N'O_{1.5}.Si_{2-\lambda}B_\zeta$, $Li_2O.N'O_2.SiO_{2-\lambda}B_\zeta$ or combinations thereof.

9. The positive active material of claim 1, wherein the weight content of the coating layer of lithium transition metal silicate represented by Formula $x'Li_2O.y'N'O_a.SiO_{2-\lambda}B_\zeta$ in the positive active material is 0.01%-30%.

10. A secondary lithium battery, comprising a positive electrode, a negative electrode and a separator between the positive electrode and the negative electrode, wherein the positive electrode comprises the positive active material of claim 1.

11. The positive active material of claim 1, wherein in the lithium transition metal oxide represented by Formula $Li^x_-M_yN_{1-y}O_{2-\alpha}A_\beta$, the element represented by M is one or two of Ni, Co, and the element represented by N is one or more of the Mg, Al, Ti, B, V, Mo, W, Ni, Co, Mn, Y, Ce; $0.7 \le y \le 1.0$.

12. The positive active material of claim 1, wherein the element represented by N in Formula $Li_xM_yN_{1-y}O_{2-\alpha}A_\beta$ is at least one of Mg, Al, Ti, B, Mo, Zr, V, Ce, W, and $0.99 \le y \le 1.0$.

13. The positive active material of claim 1, wherein the weight content of the coating layer of the lithium transition metal silicate represented by Formula $x'Li_2O.y'N'O_a.SiO_{2-\lambda}B_\zeta$ in the positive active material is 0.01%-5.0%.

* * * * *